(12) United States Patent
Müller

(10) Patent No.: US 6,299,203 B1
(45) Date of Patent: Oct. 9, 2001

(54) AIRBAG DEVICE IN A VEHICLE AND METHOD FOR ACTIVATING AN AIRBAG DEVICE

(75) Inventor: Olaf Müller, Rüsselsheim (DE)

(73) Assignee: INOVA GmbH Technische Entwicklungen

( * ) Notice: Subject to any disclaimer, the term of this patent is extended or adjusted under 35 U.S.C. 154(b) by 0 days.

(21) Appl. No.: 09/017,858

(22) Filed: Feb. 3, 1998

(30) Foreign Application Priority Data

| Feb. 3, 1997 | (DE) | 197 03 945 |
| Mar. 6, 1997 | (DE) | 197 09 257 |
| Apr. 14, 1997 | (DE) | 197 15 463 |
| Sep. 26, 1997 | (DE) | 297 17 250 U |
| Dec. 22, 1997 | (EP) | 97122674 |

(51) Int. Cl.[7] ................... B60R 21/26
(52) U.S. Cl. ............... 280/736; 280/741
(58) Field of Search .................. 280/736, 741, 280/735, 743.2, 743.1, 739

(56) References Cited

U.S. PATENT DOCUMENTS

| 5,513,879 | * | 5/1996 | Patel et al. | 280/739 |
| 5,676,395 | * | 10/1997 | Oe et al. | 280/730.2 |
| 5,762,367 | * | 6/1998 | Wolanin | 280/736 |
| 5,851,027 | * | 12/1998 | DiGiacomo et al. | 280/736 |
| 5,863,067 | * | 1/1999 | Blumenthal et al. | 280/741 |
| 5,934,705 | * | 8/1999 | Siddiqui et al. | 280/736 |

* cited by examiner

Primary Examiner—Kenneth R. Rice
Assistant Examiner—Lynda Jasmin
(74) Attorney, Agent, or Firm—Martin Fleit

(57) ABSTRACT

The invention relates to an air bag arrangement in vehicle, having a gas bag which, as the result of a triggering by a sensor, can be inflated with gas by a gas generator and, during the inflating, can be advanced into an interior of the vehicle, the gas generator having at least two driving stages with propellant charges which can be ignited in a time-related succession and of which the first propellant charge is ignited by a triggering by a sensor and the second propellant charge being ignited facultatively when the gas bag moves beyond a defined advancing position. In addition, the invention relates to a triggering process for an air bag arrangement, wherein, as a function of the driving situation, a first stage of at least one gas generator or at least a first gas generator is triggered, the gas generated in this manner is guided into at least one gas bag for its partial filling, at least one possible hindering of the expansion of the gas bag is detected, and in the case of an unhindered expansion of the gas bag at least one additional stage of the gas generator or at least one additional gas generator is triggered for the further or complete filling of the gas bag.

26 Claims, 14 Drawing Sheets

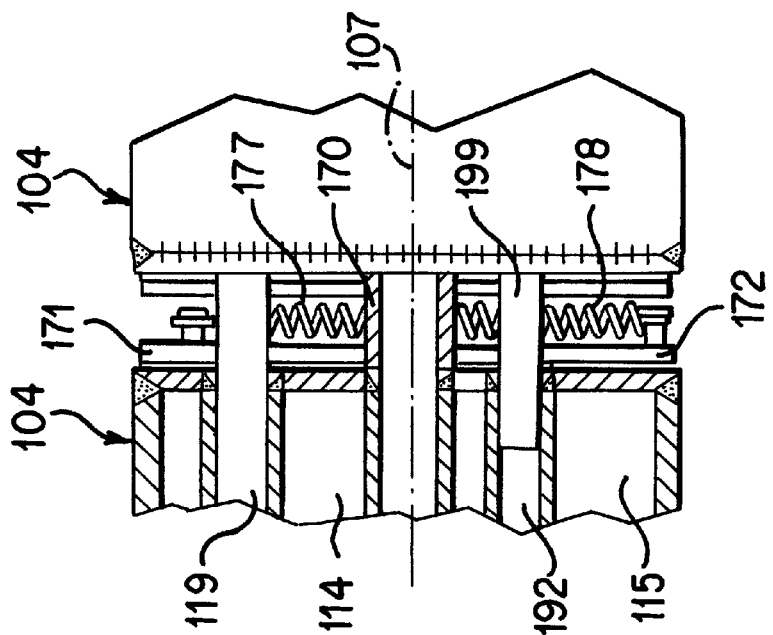
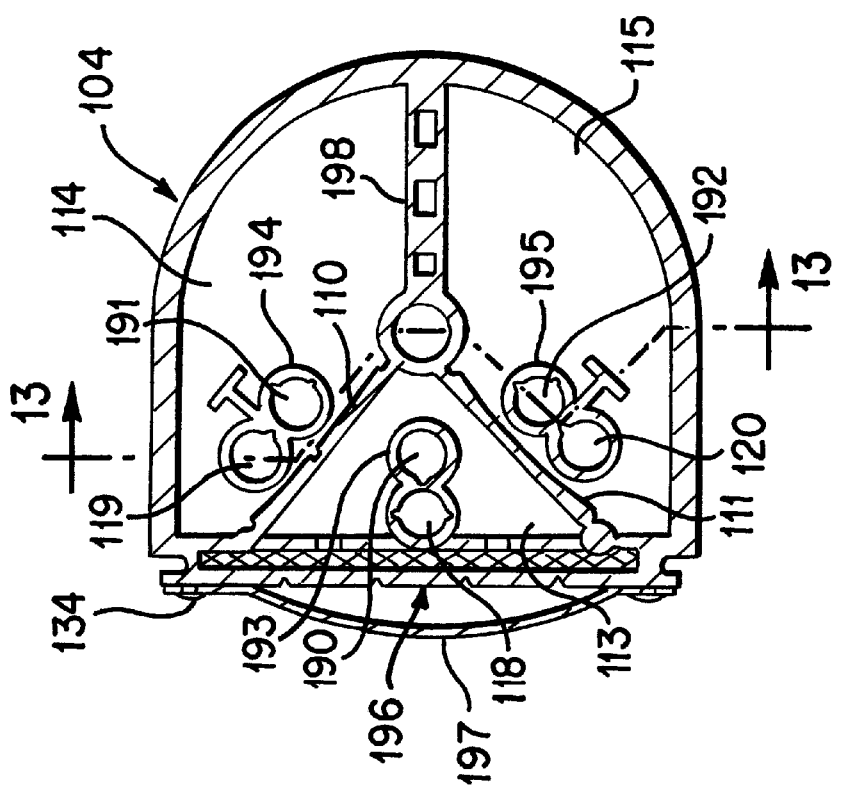

AIRBAG DEVICE IN A VEHICLE AND METHOD FOR ACTIVATING AN AIRBAG DEVICE

BACKGROUND OF INVENTION

1. Field of Invention

The invention relates to an air bag arrangement in a vehicle, having a gas bag which can be inflated with gas as the result of the triggering of a sensor caused by a gas generator and which, during the inflating, can be advanced into an occupant compartment of the vehicle. Furthermore, the invention relates to a triggering process for an air bag arrangement.

2. Description of Prior Art

Air bag arrangements in vehicles, for example, motor vehicles, will carry out their protective effect only if a person to be protected maintains a certain distance from the arrangement. Such a distance is normally ensured when the seat belt is worn. When the distance between the head and a triggering air bag or gas cushion is too short, for example, in the case of a person not wearing a seat belt who, during a full braking operation preceding the accident, is moved in the direction of the air bag arrangement, the force of the inflating air bag may cause serious injury to the person to be secured which may be as severe as a breaking of the neck.

SUMMARY OF INVENTION

It is an object of the present invention to improve an air bag of the above-mentioned type such that the danger of an injury to a vehicle occupant caused by the air bag arrangement is reduced.

According to the invention, this object is achieved by an air bag arrangement.

Advantageous embodiments of the invention are found in the dependent claims and their combinations.

In the case of the air bag arrangement according to the invention, the moving action of the gas bag controls the ignition of at least a second propellant charge or stage of the gas generator and therefore the further expansion of the gas bag. For this purpose, the air bag arrangement itself determines whether the gas bag can expand and advance in an unhindered manner or whether it encounters an obstacle. In the latter case, the second and/or possibly any additional propellant charge is not ignited. The impact energy of the gas bag on an obstacle, for example, on a vehicle occupant's body or head or on a child seat, is therefore reduced. The air bag arrangement can therefore recognize a vehicle occupant's position on his seat and can correspondingly control the inflating of the gas bag in two or more stages. The invention therefore provides a so-called soft air bag which automatically takes into account an occupant's "out-of-position" condition.

The first stage or propelling charge is preferably ignited electrically. The second or each additional stage of the gas generator can be ignited electrically or mechanically, for example, by means of a percussion igniter.

During its advance generated by the propellant of the first stage, the gas bag preferably determines itself whether an obstacle is situated in its inflating direction and will then, as required, also trigger the second stage or propelling charge. In particular, at least one tension element, such as a rope, a string or a strap, may be provided as the device suitable for this purpose, which, on one side, is fastened to a point at the gas bag which, when the gas bag is advanced, is on the forward front and is immediately decelerated in the event of an impact on an obstacle, and, on the other side, is fastened to a mechanical actuating device for an igniter for the propelling charge of the second or an additional stage. Such a mechanical actuating device may act directly on a mechanically triggerable igniter or be coupled with a switch by means of which an electric igniter can be triggered. The tension element has a defined length and is housed in a, for example, folded or loosely placed manner in the folded gas bag. Such a tension element is provided for each stage, starting from the second stage, and has such a length that a respective successive stage is triggered in that, in the event of an unhindered inflating of the gas back beyond a position in which the tension element of the next following stage is completely tensioned, the tension element triggers the actuating device of the corresponding next stage.

The gas generator expediently has a housing which contains a number of propellant chambers separated by fixed partitions, which number corresponds to the number of stages. The chambers are filled, for example, by a conventional propellant. An igniting device is assigned to each chamber by means of which the propellant contained in the chamber can be ignited. The igniting devices are expediently housed in ignition chambers separated from the propellant chambers so that the filling-in of the propellant and the installation of the ignition devices, such as ignition cartridges or electric ignition devices, can take place in a mutually independent fashion. The gas generator may be constructed as a hybrid generator which has additional ignition chambers filled with a solid explosive agent for igniting the gas and for breaking-open the, for example, axial front-side boundary walls of the propellant chambers. Instead of using one gas generator with several chambers for forming several stages, the latter may also be formed by a corresponding number of separate gas generators.

The mechanical ignition device of the second stage may have a piston or a similar movable element as the actuating device which can be moved from its inoperative position, after the triggering by the gas bag, onto, for example, a ring igniter or percussion igniter of an ignition cartridge in that the movement is transmitted to the piston, for example, by means of the tension element. The piston can also be held in a blocked manner under a spring prestress within the actuating device so that the tension element must only eliminate the blocking and must not transmit the movement energy to the piston. By means of the various mentioned embodiments of the actuating device, any movement direction can be provided for triggering the igniter independently of the direction of the force generated by the tension element. As a result, any mechanical types of igniters can be triggered and therefore used. By means of each of the mentioned methods, mechanical switching devices can be triggered in the actuating device and themselves, in turn, activate an electric ignition.

In order to permit a further movement of the gas bag after the tensioned tension element or rope has moved the piston, the tension element can be uncoupled from the piston. As an alternative, the tension element and/or its fastenings on the gas bag and/or on the actuating device may have a desired breaking or tearing point.

Advantageously, a construction of the actuating or ignition device can be selected which contains an electrically or mechanically ignitable ignition cartridge and a projectile which is moved in an accelerated manner by the ignited ignition cartridge and causes the release of the propellant of the gas generator. Such an actuating or ignition device is simple and operationally reliable and ensures the exact ignition of the gas generator with respect to time. Preferably, the ignition device is suitable for multi-stage gas generators in the case of which it then, in particular, mechanically ignites the second stage or an additional stage of the gas generator or mechanically triggers an electric ignition. The triggering unit of the ignition device will then expediently be triggered by way of a tension element, such as a rope, a string or the like, which is connected with an unfolding and advanceable section of the gas bag so that, when this gas bag is filled with propellant, after a defined movement path, which is determined by the length of the loosely placed tension element, it triggers the ignition device along the whole then tensioned tension element.

The gas generator may, for example, have pressure gas as the propellant for the gas bag or it may be constructed as a hybrid generator which has additional ignition chambers filled with a solid explosive agent for igniting the propellant and for breaking open the chamber walls. Likewise, the gas generator may be a pure solid-fuel generator which has a pyrotechnic solid fuel for generating the propellant for the gas bag.

In general, the air bag arrangement may have several gas generators and also a gas bag device with several gas bags respectively which may form an individually controllable gas bag front, particularly in the case of the multi-stage gas generators which have several successively ignitable propelling charges.

In a preferred embodiment, the air bag arrangement according to the invention may have not only one gas bag or air bag but several air bag generators or segments with gas bags which, from a certain arrangement in the vehicle, move forward, as required, into the occupant compartment by being filled with propellant. In this case, the filling of, for example, gas bags takes place in stages by means of propellant from the respective gas generators, in which case the air bag arrangement determines independently for each gas bag whether it can inflate and move forward in an unhindered manner or whether it strikes an obstacle. In the latter case, no additional filling with propellant is initiated. The impact energy of the gas bag onto an obstacle as, for example, a vehicle occupant's body or head, or a child seat, is therefore reduced. The air bag arrangement can therefore recognize the position of a vehicle occupant on his seat and correspondingly control the inflating of the gas bag. Corresponding to the number of stages of the gas jenerator, the air bag arrangement detects the expansion possibility of the gas bag several times in a time succession. If it determines in each case that no obstacle is situated in the main advancing direction of the gas bag, propellant is correspondingly introduced several times into the respective gas bag in order to inflate it. Thus, a vehicle occupant or a child in a child seat can be caught in a frontally soft manner and can also be surrounded and protected laterally. The several individual gas bags may also be formed by one gas bag with several chambers, in which case the individual bag parts can advance largely automatically.

This principle is, for example, also suitable for a head support air bag, in which case the inflation control of gas bags which are lateral with respect to a headrest permit an "out-of-position" catching of the occupant's head. If the head is arranged centrally with respect to the head rest, as the result of the fact that there is no ignition of further stages or filling the concerned gas bag, a complete inflating of the corresponding air bag which is dangerous to the occupants is prevemted. In the same manner, the mentioned principle can also be used for side air bags with the same advantages.

The first stages of the air bag generators are preferably ignited simultaneously because of the triggering of a sensor, particularly an electrically triggered ignition being provided. The propellant of the first stages can inflate and advance the respective gas bags to the same extent so that a joint uniform gas bag front is created in the main advancing direction. As an alternative or in addition, the propellant charges of the first and also of the additional stages may have different sizes, and the gas bag may also have different sizes and inflating shapes so that an overall gas bag inflating front is provided which can be adapted to the installing situation.

The additional stages of the gas generators can be ignited electrically or mechanically, for example, by means of percussion igniters.

During its advance, each gas bag preferably determines itself whether an obstacle is situated in its expanding direction, and then also triggers the next stage or propellant charge. Such a device preferably contains a tension element, such as a rope, a string or a strap, which, on one side, is fastened to a point at the gas bag which, when the gas bag advances, is at the forward front and, when there is an impact on an obstacle, is immediately decelerated, and, on the other side, is fastened to a mechanical actuating device for an igniter for the propellant charge of the next stage. The tension element has a defined length and is housed in the folded gas bag, for example, in a folded or loosely placed manner. Such a tension element is provided for each stage or propellant charge of the gas generator, the length of the tension element being adapted to the respectively desired triggering position of the gas bag.

Preferably, each gas generator has a separate housing which contains several chambers whose number determines the number of the above-mentioned stages. The chambers are filled with a conventional propellant. The individual housings may have a largely identical construction and are assembled to form the air bag arrangement. As an alternative, the gas generators may be housed in a joint housing. An ignition device is assigned to each chamber and ignites the propellant contained in the chamber. The ignition devices are preferably housed in ignition chambers separated from the chambers so that the filling-in of the propellant and the installation of the ignition devices, such as the ignition cartridges, can be carried out independently of one another.

The gas generators may be constructed as hybrid generators which have additional ignition chambers filled with a solid explosive agent for igniting the gas and for breaking open the partitions.

The mechanical ignition device may have at least one ignition plate which is rotatably disposed on a central bearing axis next to a segment and is moved by the tension element so that it can impact on a percussion igniter of an ignition cartridge. In order to permit a continued movement of the gas bag, the tension element can be uncoupled from the ignition plate after it has moved it. As an alternative or in addition, the tension element may have a desired breaking point.

For achieving the goal of further increasing the safety for, for example, motor vehicle occupants, it is also suggested by means of the present invention to house air bag arrangements in a vehicle seat. As the result, a vehicle seat is created in which at least one air bag arrangement is provided which contains mechanical occupant-position-dependent controls which are designed for stopping zhe inflating and unfolding of the air bag devices if the inflating and unfolding is hindered by a meeting of the air bag and an occupant.

This eliminates the problem in the use of air bags that, by means of their abrupt inflating, an incorrectly or not optimally positioned occupant may be injured. The present invention therefore suggests an air bag with a sensor system for detecting the position of an occupant and a control for the air bag which controls the inflating of the latter as a function of a detected occupant position.

An air bag arrangement of a seat according to the invention preferably has a multi-stage operating device whose first stage, as a function of an accident, is, for example, electrically ignited or generally triggered. The second stage and possibly additional stages of such a multi-stage operating devices is/are triggered as a function of the meeting of the air bag and an occupant. If an occupant strikes the gas bag of the air bag by means of a body member which is to be protected by the air bag and hinders it with respect to a further unfolding, this prevents the ignition of a further stage or possibly additional stages.

In a simple manner, this is achieved according to preferred embodiments of the invention in that, at defined positions of the air bag, tension elements, such as ropes or strings, are connected in the interior of the air bag which, when the air bag is inflated in an unhindered manner, as the result of the fact that a tensile force is exercised beyond their tensioned condition, mechanically trigger the respective next following stage. If the inflating of the air bag does not take place in an unhindered manner, because, for example, an occupant collides with the air bag and prevents it from a further unfolding in the direction of the occupant, the corresponding ropes or strings are not tensioned and also trigger no additional stage of the pertaining operating device.

According to the invention, this technique is used in seat-integrated air bags, headrest air bags and/or seat rear side air bags for back seat passengers. By means of seats equipped in this manner, the safety of the vehicle occupants will be optimized further.

It is important in all embodiments of the invention that no separate detectors or sensors detect an occupant position and an occupant posture and as a function thereof influence the inflating operation of a gas bag of an air bag but that the expanding action of the gas bag of the air bag is controlled by the gas bag itself. Therefore, the gas bag of the air bag arrangement itself scans its own expansion operation itself and thus controls its further expansion.

It also within the scope of the invention for several devices, such as tension elements, to be provided for a stage of the air bag arrangement and for a subsequent stage to be triggered only when all devices which are assigned to a stage determine an unhindered expansion of the gas bag. In other words, a subsequent stage will be triggered only when the gas bag can expand unhindered in all corresponding directions and all devices act correspondingly. The same effect can be achieved by means of several separate gas bags with one corresponding device per stage respectively. Instead of an AND-linking or AND-coupling of several such devices for one gas bag or several gas bags, an OR-linking or OR-coupling can also be provided; that is, that it is sufficient for, for example, one of several such devices to act corresponding to an unhindered expanding of the gas bag in order to trigger the next following stage for this air bag or all air bags.

It is another object of the present invention to indicate a reliable triggering process for an air bag arrangement.

This object is achieved by means of a triggering process for an air bag arrangement according to claim 26. Correspondingly, the following takes place successively:

a) As a function of the driving situation, a first stage of at least one gas generator or at least a first gas generator is triggered;

b) the gas generated in this manner is introduced into at least one gas bag for its partial filling;

c) at least one possible hindering of the expansion of the gas bag is detected; and d) in the case of an unhindered expansion of the gas bag at least one additional stage of the gas generator or at least one additional gas generator is triggered for the further or complete filling of the gas generator.

It is preferred in the case of the triggering process according to the invention for an air bag arrangement that the at least one additional stage of the gas generator or that the at least one additional gas generator are triggered by a mechanical coupling to the gas bag for the further or complete filling of the gas bag in the case of an unhindered expansion of the gas bag during the function of the first stage or of the first generator.

Additional advantageous and preferred embodiments of the process according to the invention are obtained from the analogous use of the device claims and from this description.

BRIEF DESCRIPTION OF DRAWINGS

In the following, the invention will be explained in detail by means of embodiments with reference to the drawings.

FIG. 12 is a cross-sectional view of an embodiment of the gas generator of the air bag arrangement designed as a hybrid generator;

FIG. 13 is a cross-sectional view according to the intersection line shown in FIG. 12 of a connection between two hybrid generators;

DETAILED DESCRIPTION OF PREFERRED EMBODIMENTS

Figure 1:
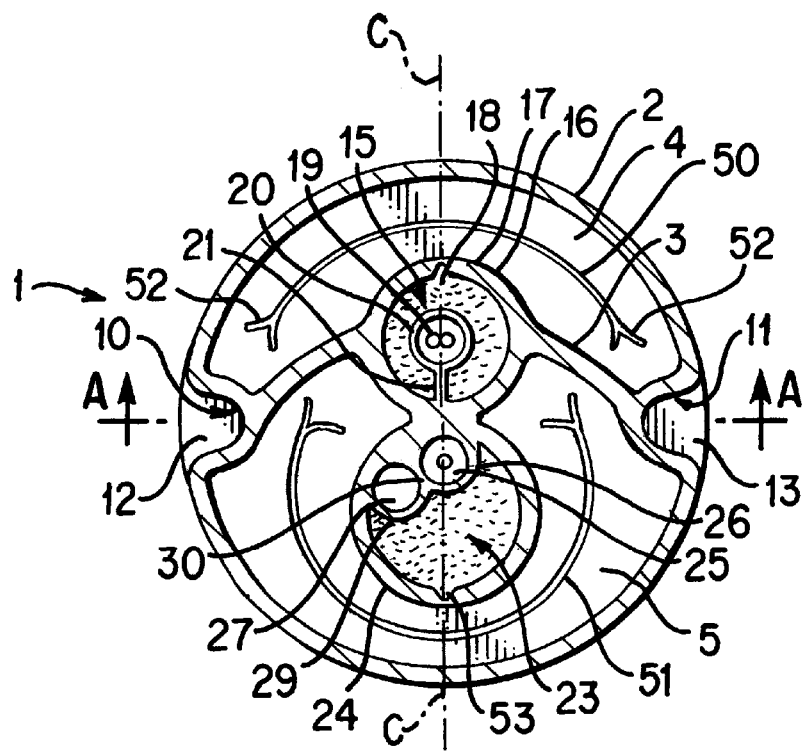
FIG. 1 is a sectional view of an air bag arrangement according to the invention.

On the basis of the description and the drawings, identical or similar parts and components as well as identically or similarly acting elements and structural components are easily recognizable for a person skilled in the art. Only special characteristics which are explained in conjunction with individual embodiments can also be combined with other embodiments of the invention by a comparing consideration and on the basis of the knowledge of a person skilled in the present field. The invention is not limited to the embodiments discussed in the following and illustrated in the drawings but comprises any modifications, variations and substitutions which can be recognized by a person skilled in the art, particularly within the scope of the above explanations of the invention and of the claims.

Figure 2:
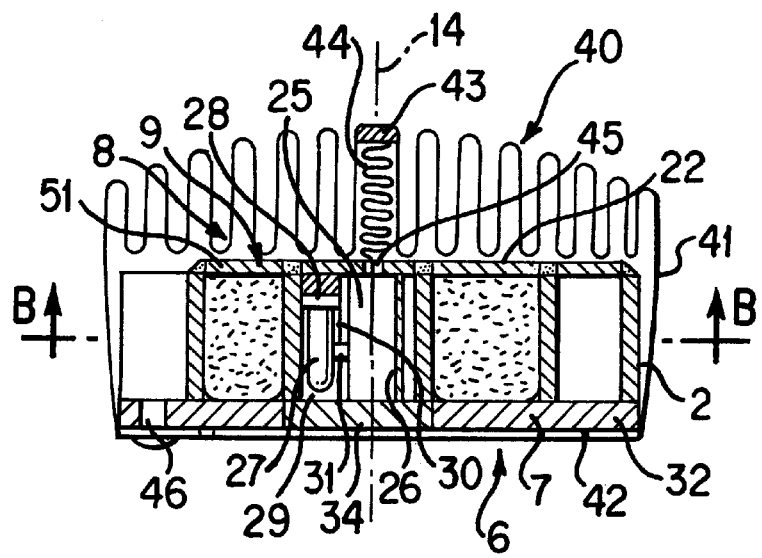
FIG. 2 is a sectional view according to Line A—A in FIG. 1 of the air bag arrangement, Line B—B indicating the position of the section of FIG. 1.

An air bag arrangement according to the invention, as illustrated in a first embodiment in FIGS. 1 and 2, contains a housing 1 of a gas generator which has an essentially cylindrical exterior wall 2 so that it can be housed centrally in a steering wheel of a motor vehicle.

The housing is manufactured, for example, of an extruded profile made of light metal and contains a partition 3 which divides the housing 1 into a first propellant chamber 4 and a second propellant chamber 5. Furthermore, the housing 1 contains a floor 7 on its underside 6 and a covering 9 on its top side 8, which covering 9 is mounted on the housing 1 in a gas-tight manner so that the propellant chambers 4, 5 are closed in a gas tight manner.

As illustrated in FIG. 1, the cylindrical exterior wall 2 of the housing 1 has two inwardly set-back wall sections 10, 11 at two mutually opposite points so that groove-shaped indentations 12, 13 are formed which extend in parallel to the central longitudinal axis 14 of the housing 1 and provide space to fastening screws by means of which the housing 1 is held in the steering wheel. The partition 3 extends, for example, in a curved manner between the two indentations 12, 13. In its central section, the partition 3 forms a cylindrical first ignition chamber 15 of a first propellant stage of the gas generator which is surrounded by a cylindrical ignition chamber partition 16 and is therefore bounded with respect to the first and the second propellant chamber 4 and 5. A section 17 of the ignition chamber partition 16 which curves into the first propellant chamber 4 contains on its interior side pointing to the ignition chamber 15 a desired breaking point in the form of a weakening, indentation or groove 18 which is formed, for example, in parallel to the longitudinal axis 14 of the housing 1. In the interior of the ignition chamber 15, an electric igniter 19 is provided which is contained in an igniter housing 20 which is held, for example, by a web 21 connected with the ignition chamber partition 16.

On the top side 8 of the housing 1, a metal plate or metal membrane 22 is connected as the covering 9 in a gas-tight manner by means of welding with the front-side edges of the exterior wall 2, the partition 3 and the ignition chamber partition, as shown in FIG. 2.

As in FIG. 1, a, for example, cylindrically shaped second ignition chamber 23 is provided for the second propellant chamber which is part of a second propellant stage of the gas generator, which ignition chamber 23 is arranged approximately in the center with respect to a plane of symmetry C—C of the housing 1. In the area of the central longitudinal axis 14 of the housing 1, the partition 24 of the ignition chamber 23 may be connected with the first ignition chamber partition 16. Within the second ignition chamber 23, a piston 25 is guided in a cylindrical guide 26 so that it can be moved in parallel to the longitudinal axis 14. Adjacent to the piston 25, an ignition cartridge or general ignition charge 27 with a rim igniter 28 is arranged in an ignition chamber 29 such that the rim igniter 28 is situated in the area of the top side 8 of the housing 1. The ignition chamber 29 and the cylindrical guide 26 are opened toward one another by means of a slot-shaped opening 30. A lateral nose 31 of the piston 25 engages in this slot-shaped opening 30 so that the piston 25 arranged on the floor 7 in its inoperative position strikes by means of its nose 31 onto the rim igniter 28 and ignites the ignition cartridge 27 when it is moved upward in its guide 26. The metallic membrane 22 is also welded to the front side of the ignition chamber partition 24.

According to the illustration of FIG. 2, the floor 7 of the housing 2 comprises a fixed floor plate 32 which, on the housing 1, is fixedly connected with the exterior wall 2, the partition 3 and the ignition chamber partitions 16, 24, for example, by means of welding, for sealing off the two propellant chambers 4, 5. Concentrically to the first and to the second ignition chamber 15 and 23, screw caps (see, for example, screw cap 34) are provided in openings of the floor plate 32 whose diameter is adapted approximately to the cross-section of the respective ignition chamber 15, 23 and which can be screwed into a thread on the floor plate 32 so that they axially close off the two ignition chambers 15, 23. For example, blind holes or similar indentations (not shown) are constructed in such caps 34 so that the caps 34 can be screwed into the floor plate 32 by means of a tool having corresponding projections. In the screwed-in condition, the caps 34 are planely arranged in the floor plate 32. A connection (not shown) for a connection plug (not shown) for feeding an ignition current may be provided in the cover (not shown) for the first ignition chamber 15. The electric igniter 19 can be fastened on the covering and, together with it, can be screwed into the first ignition chamber 15.

A gas bag 40 of the air bag arrangement is housed in the folded condition, as schematically illustrated in FIG. 2, on the top side 8 of the housing 1 of the gas generator under a covering which is not shown. The fabric 41 of the gas bag 40 encloses the exterior wall 2 of the housing 1 and is fastened on the underside 6 by means of a clamping ring 42 screwed to the floor plate 32. In a central area 43 of the gas bag 40, a tension element, for example, a strap or a rope 44, is fastened which, with a defined rope length, is housed in the gas bag 40 in the folded condition. An opening 45 is constructed in the metallic membrane 22 centrically with respect to the longitudinal or movement axis of the piston 25 (see FIG. 2). The rope 44, which is connected with its other end with the piston 25, is guided through this opening 45.

Two fastening holes, of which only the fastening hole 46 is visible, are provided in the floor plate 32 in the area of the two indentations 12, 13 for receiving screws or bolts for fastening the gas generator in the steering wheel.

Each propellant chamber 4, 5 contains a pressurized propellant, as used in known gas generators. The propellant can be filled in the floor plate 32 by way of one bore (not shown) respectively, which floor plate 32, after the filling, is closed off again in a compression-proof manner by means of a ball by flanging or pressing.

On the interior side of the metallic membrane 22, desired breaking points in the form of impressed or milled-in tear grooves 50, 51 are provided in the area of the propellant chambers 4, 5. FIG. 1 shows an arrangement of these grooves 50, 51 as an example. One gear groove 50, 51 respectively extends approximately along the whole length of each propellant chamber 4, 5. The ends of the tear grooves 50, 51 are branched in the manner of wedges 52 in order to facilitate the bendingopen of the metallic membrane 22.

The illustrated embodiment of the air bag arrangement is a hybrid gas generator which contains a solid explosive (illustrated in FIG. 1 by a dotted line) in each ignition chamber, which explosive can be ignited by the electric igniter 19 or the ignition cartridge 27. However, the gas generator can also be constructed without a solid explosive in the ignition chambers 15, 23, in which case the igniters 19, 27 themselves will then burst open their respective ignition chamber walls and ignite the propellant. The wall thicknesses of the partitions or the desired breaking points are then adapted to this embodiment. As an example, an additional desired breaking point 53 is illustrated on the ignition chamber partition 24. The tension element or rope 44 may have a desired breaking point at which the connection between the gas bag 40 and the piston 25 may be interrupted so that the gas bag 40 can be further inflated in an unimpaired manner after the ignition of the second propellant charge. The desired breaking point can be provided at the fastening of the rope 44 on the gas bag 40 or on the piston 25.

If a sensor, which, in particular, is sensitive with respect to vehicles, and which is not shown in detail, determines an excessive vehicle speed change, by means of a triggering of the sensor, first the ignition charge, that is, the solid explosive, in the first ignition chamber 15 is ignited by means of the electric igniter 19. The ignition chamber partition 16 surrounding the ignition charge is broken open by the ignition pressure preferably at at least one desired breaking point 18 in the direction of the propellant chamber 4. Simultaneously, the ignition pressure ignites the propellant contained therein which, in turn, breaks open the metallic membrane 22 of the housing 1, the breaking-open being defined by the desired breaking point or groove 50. The wedges 52 also facilitate the breaking-open or bending-open of the metallic membrane 22. A detaching of pieces of the metallic membrane 22 which may damage the gas bag 40 is avoided. A sieve (not shown) may be provided between the metallic membrane 22 and the gas bag 40 in order to catch metal pieces in the event that these break off. This securely prevents damage to the gas bag 40.

The propellant flows into the gas bag 40, inflates it and, while bending away the covering, pushes it in the desired direction for the protection of a vehicle occupant, the rope 44 being unfolded on its frontal end area and being moved along. The first stage of the gas generator of the air bag arrangement has therefore become effective.

If the gas bag 40 unfolding during the first stage meets an obstacle, as, for example, a vehicle occupant's head or chest, the gas bag 40 is inflated no further and the rope cannot be tensioned. The piston 25 remains in its inoperative position so that the second propellant charge of the gas generator is not ignited.

However, if the gas bag 40 can inflate further and advance in an unhindered manner beyond a defined range, the rope 44 adjusted to a defined length is tensioned and abruptly moves the piston 25 forward in the guide 26 toward the top side 8 until the nose 31 of the piston 25 impacts on the ring igniter 28 of the ignition cartridge 27. The explosion of the ignition cartridge 27 breaks open the ignition chamber partition 24 toward the propellant chamber 5, in which case desired breaking points, such as the desired breaking point 53, can facilitate the breaking-open or define the location of the breaking-open, and the propellant ignites in the second propellant chamber 5. The pressure of the ignited propellant breaks open the metallic membrane 22 on the groove 51 so that the propellant flows into the gas bag 40, inflates it and moves it farther into the advancing direction.

The size of the propellant chambers filled with the propellant and/or the filling propellant quantity may differ according to the demands on the triggering action in order to provide a corresponding inflation action of the gas bag 40.

Because of its compact construction, the described air bag arrangement is particularly suitable for being housed in a steering wheel of a vehicle but may also be arranged at a different point in a vehicle, as, for example, in a backrest of the front seats, in the dashboard of a vehicle in front of the front passenger seat, in the side walls of a vehicle, in a vehicle seat or in a headrest. The cylindrical shape of the housing may be altered corresponding to the installation condition, for example, into an oval or rectangular shape.

In the following, further embodiments of the invention will be explained with reference to FIGS. 3 to 13.

Figure 3:
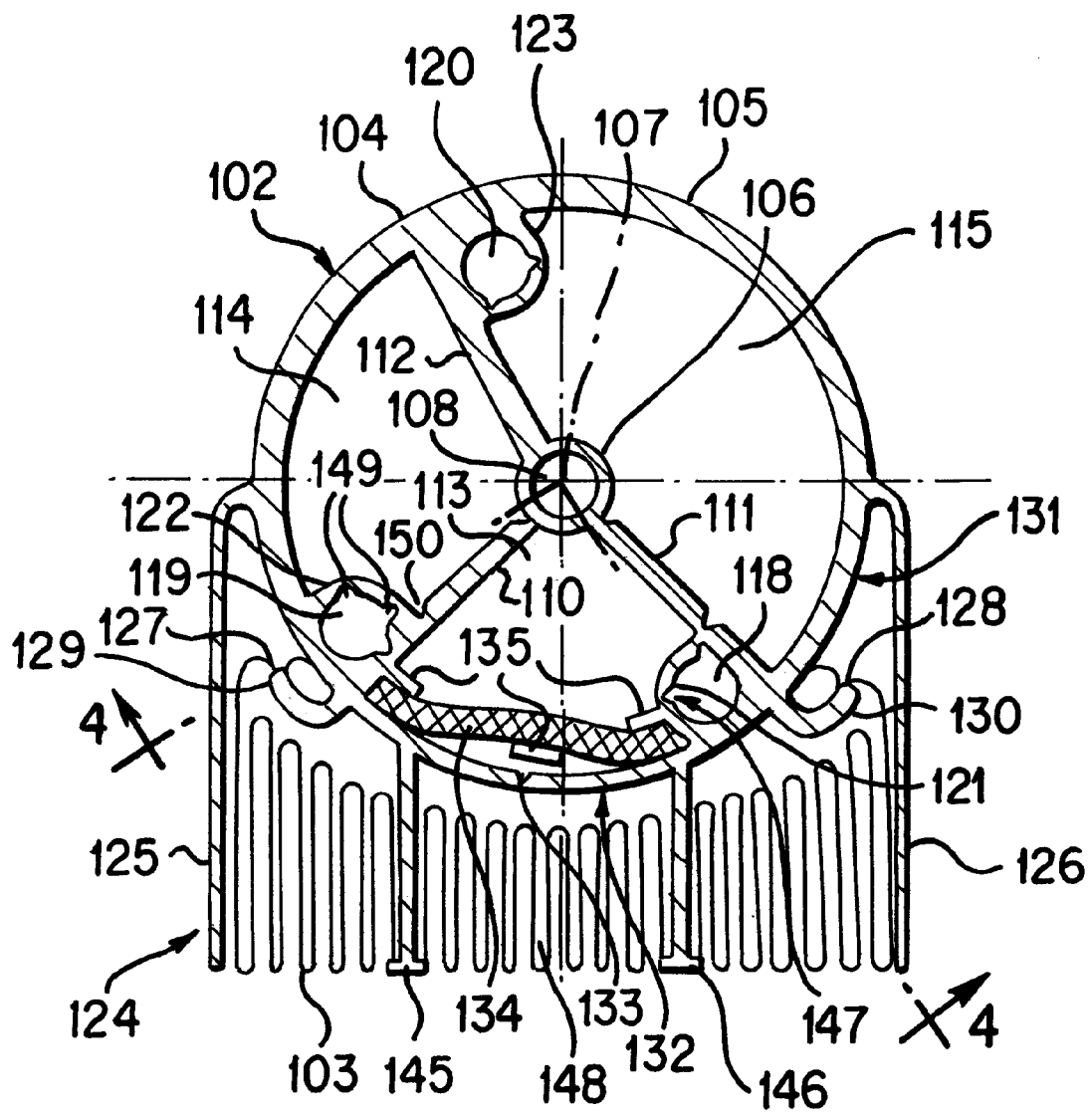
FIG. 3 is a cross-sectional view of an air bag arrangement according to the invention.
Figure 4:
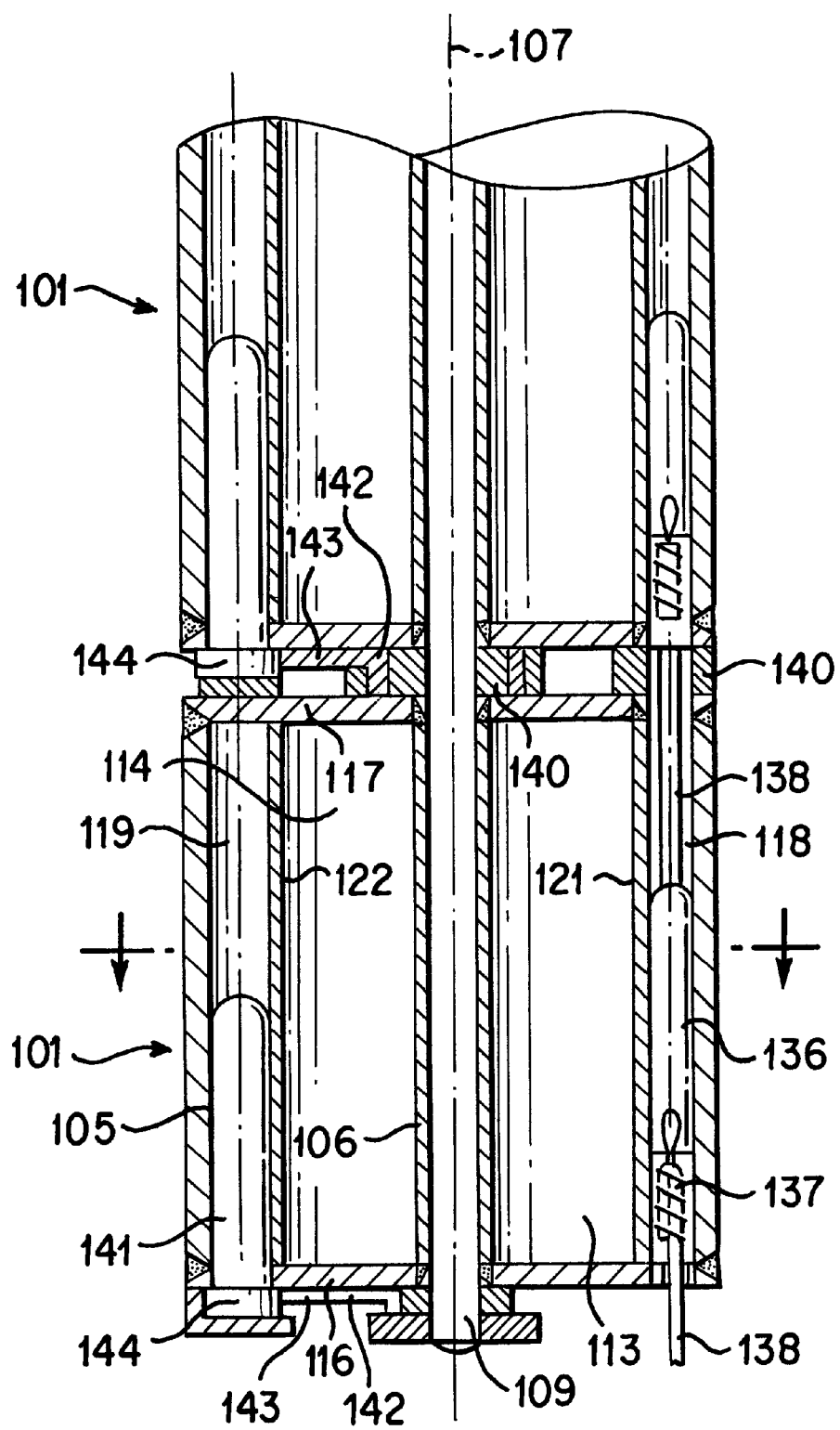
FIG. 4 is a longitudinal sectional view of the air bag arrangement illustrated in FIG. 3.
Figure 5:
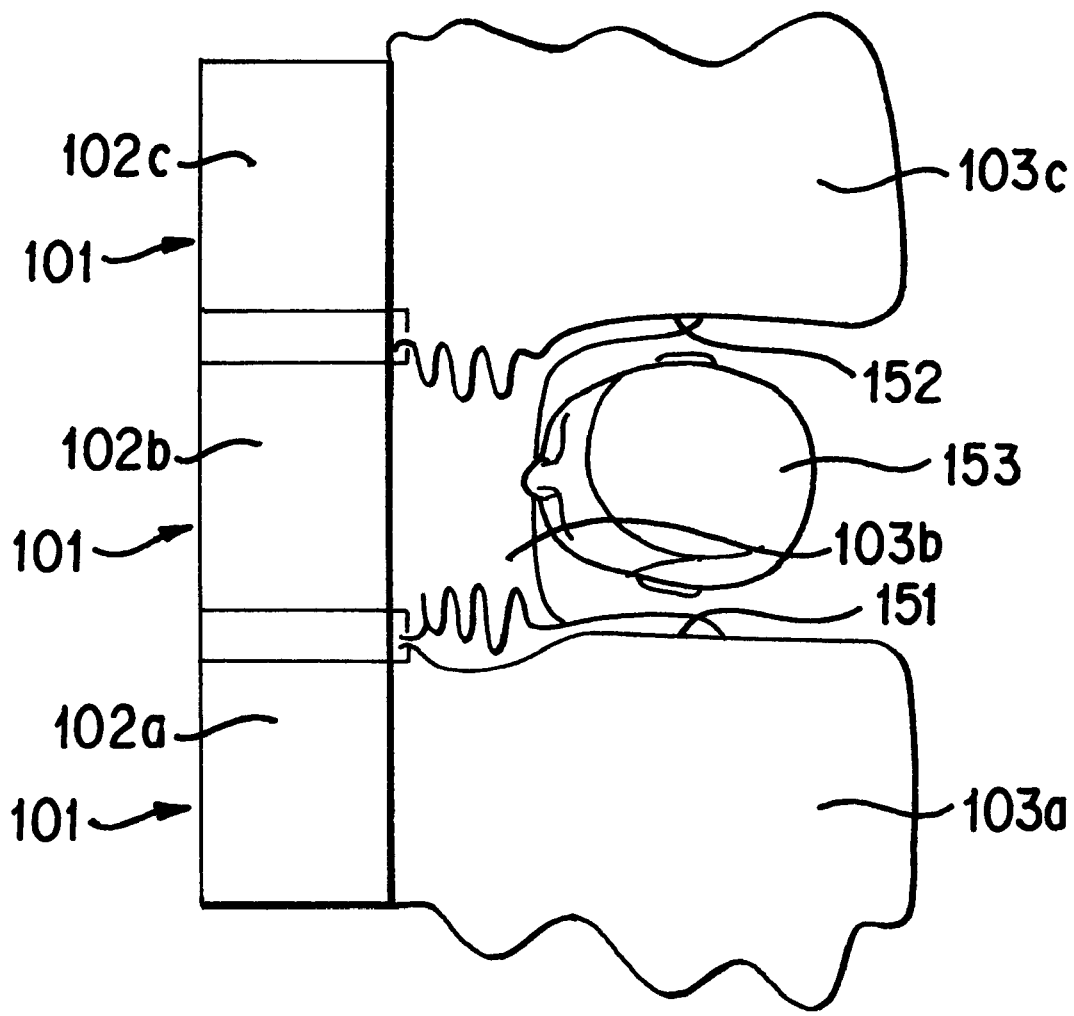
FIG. 5 is a schematic top view of the air bag arrangement in an installed position in a vehicle with differently inflated gas bags.

A further embodiment of an air bag arrangement of the invention according to FIGS. 3 and 4 contains three air bag generators 101 which are connected with one another and form a structural unit (FIG. 5). Each air bag generator 101 contains a gas generator 102 and a gas bag 103. The gas generator 102 has a housing 104 made of an extruded light metal profile with a, for example, approximately cylindrical exterior wall 105. A central cylindrical interior wall 106 forms coaxially to a central longitudinal axis 107 a continuous opening 108 through which a straining screw 109 (FIG. 4) is guided. In the embodiment, three gas generators 102 or air bag generators 102 arranged side-by-side are axially fixedly connected with one another by means of the straining screw 109 with the inserted spacer sleeves 140. The interior of the housing 104 is divided into three chambers 113, 114 and 115 by means of three partitions 110, 111, 112 which extend between the interior wall 106 and the exterior wall 105 along the whole axial length of the housing 104. On its two open axial ends, the extruded profile of the housing 104 is closed off by means of plate-shaped covers 116, 117 which are welded to the extruded profile. As a result, the three chambers 113, 114 and 115 are closed off in a gas-tight manner. Each chamber contains a pressurized propellant, as used in the known gas generators. By way of a bore 163 (see FIGS. 6 and 7), the propellant can be filled in one of the front-side lateral lids 116 which, after the filling, is closed off again in a pressure-tight manner, for example, by means of ball by flanging or pressing.

Each chamber 113, 114, 115 has an ignition chamber 118, 119, 120 which are in each case constructed in the extruded profile as a longitudinal duct which is bounded in the direction of the pertaining chamber 113, 144, 115 by a respective ignition chamber partition 121, 122, 123.

A gas bag housing 124 as part of the extruded profile is integrated in the housing 104 for receiving the gas bag 103. The gas bag housing 124 has a housing wall 125 and 126 which, according to FIG. 3, is on the top and on the bottom, and which extend on a circumferential side of the housing 104 approximately i n parallel away from the housing 104. In the space formed between the housing walls 125, 126 and the exterior wall 105 of the housing 104 (as well as side walls not shown in detail), the folded gas bag 103 is housed in the inoperative or operative condition. The fastening of the gas bag 103 on the housing 104 of the gas generator 102 takes place at bag rims, of which an upper bag rim 127 and a lower bag rim 128 are illustrated in FIG. 3 which are mounted in a gas-tight manner on fastening rails 129, 130 on the exterior side 131 of the housing 104. The bag rims enclose an area 132 of the exterior wall 131 of the housing 104 on whose interior side the first chamber 113 is arranged with its two partitions 110, 111. The wall area 132 has at least one desired breaking point 133 which is constructed as a reduced wall thickness or notching in a, for example, central longitudinal arrangement. On the interior side of this wall area 132, a sieve 134 is arranged and is fastened by means of holding elements 135 on the housing 104.

In the first ignition chamber 118 arranged in the first chamber 113, for example, in a corner area, a propellant igniter unit is housed which has an ignition charge 1 36 with a pyrotechnic propellant charge which can be ignite d by way of an electric igniter 137 which has a feed line 138. The three air b a g generators 101 and the housings 104 of the three gas generators 102 are arranged such with respect to one another that the respective first ignition chambers 118 form a continuous axial longitudinal duct through which the feed lines 138 are guided to each ignition charge 136. The ignition charges 136 and the feed lines 138 are cast in the longitudinal duct by means of a thermoplastic casting compound.

The second and the third ignition chamber 119, 120 each contain a propellant ignition unit with an ignition cartridge 141. For each ignition cartridge 141, a ring igniter 142 is provided which is disposed on the housing 104 and which, by means of a lever 143, can strike onto a percussion igniter 144 of the ignition cartridge 141 and can thus ignite the ignition cartridge 141. Each ring igniter 142 is connected with a tension element 145, 146, such as a triggering thread or rope (FIG. 3) On the other hand, the tension elements 145, 146 are fastened at defined points of the forward bottom of the gas bag 103 and are housed with the folded gas bag 103 such that they can move together with the unfolding gas bag 103 along a certain path section until they are tensioned. If the tension elements 145, 146 move farther in t he tensioned condition, they move the ring igniters 142 and thereby mechanically trigger the ignition cartridges 141. The respective length of the tension elements 145, 146 is the result of the installation situation and may differ. The tension elements 145, 146 may have desired breaking points at which the connections between the gas bag and the ring igniter can be interrupted so that the gas bag can unfold further. The desired breaking points may also be provided on the fastenings of the tension elements 145, 146 on the gas bag 103 or on the ring igniter 142.

If a sensor which, in particular, is sensitive to the vehicle and is not shown in detail, determines an excessive vehicle speed change, by means of a triggering by the sensor, first the ignition charges 136 in the first ignition chambers 118 of all three gas generators 102 are electrically ignited in a simultaneous manner. The ignition chamber partition 121 surrounding the ignition charge 136 is broken open by the ignition pressure preferably at at least one desired breaking point 147 in the direction of the propellant chamber 113. Simultaneously, the ignition pressure ignites the propellant contained therein which, in turn, breaks open the exterior wall 105 of the housing 104 in the area 132 preferably at the desired breaking point 133, flows through the sieve 134 in a center area 148 of the gas bag 103 and inflates it in the process and advances it in the desired direction. The sieve 134 holds back particles which may have been created during the ignition and which may damage the gas bag 103. Thus, the first stage of the air bag generators 101 has become effective.

If one of the three gas bags 103 which unfold during the first stage, for example, the gas bag 103b of the center air bag generator 101, strikes an obstacle, as, for example, a vehicle occupant's head (see FIG. 5), no further propellant filling of the gas generator 102 will be ignited because the gas bag 103b will not yet tension the tension element or the triggering rope 145 of the second stage or chamber 114.

If, however, the gas bag 103 can further unfold and advance in an unhindered manner beyond a first defined area, the triggering rope 145 adjusted to a certain length is tensioned and can immediately actuate the ring igniter 142 for the ignition cartridge 141 for igniting the propellant charge in the second chamber 114 (second stage of the gas generator 102). The ignition cartridge 141 in the ignition chamber 119 breaks open the ignition chamber partition 122 in the direction of the chamber 114, in which case the desired breaking points 149 may facilitate the breaking-open or may define the location of the breaking-open, the propellant ignites in the second chamber 114. The pressure of the ignited propellant breaks open the partition 110 so that the propellant can flow by way of the first chamber 113 and the formed opening in the exterior wall 105 in the area 132 into the gas bag 103, can inflate it and can move it farther in the advancing direction. It may also be provided that the ignited ignition cartridge 141 weakens the stability of the partition 110 at a desired breaking point 150 and thus promotes its breaking-open by the ignited propellant.

If the gas bag 103 strikes an obstacle during its advancing movement, as in the above-described case, no further stage is ignited for the further inflating of the gas bag 103. If, in contrast, the gas bag 103 can expand unhindered in the advancing direction, the second triggering rope 146 which has a defined length and which so far has moved along freely with the gas bag 103 is tensioned in an advancing position of the gas bag 103 corresponding to its length and, if it is moved farther, it will actuate the next ring igniter 142 for the third stage which, in turn, ignites the ignition cartridge 141 of the third ignition device in the ignition chamber 120. After the breaking-open of the ignition chamber partition 123, possibly aided by desired breaking points, the propellant charge in the chamber 115 is ignited in which case, because of its explosive pressure, the partition 111, possibly aided by desired breaking points, is broken open so that the propellant can flow into the gas bag 103.

An example of the advancing possibilities of the gas bags 103 of the arrangement according to the invention is schematically illustrated in FIG. 5. The center gas bag 103b is inflated by the first stage of the center gas generator 102b, whereas the two lateral gas bags 103a and 103c are inflated completely by the triggering also of the second and third stage of the respective gas generator 102a and 102c and are in their forward advancing position. By means of the illustrated connection 151 and 152 between the gas bags 103a and 103b or 103b and 103c, it is ensured that, on the one hand, a vehicle occupant 153 cannot fall through between the gas bags and, on the other hand, each individual gas bag can move independently along approximately 150% of its possible advancing path. This ensures a soft impact and an enclosing of the head, of a child seat or the like. The force acting upon the obstacle is therefore lower because of the reduced filling volume than in the case of a completely filled gas bag.

Instead of one or several desired breaking points or an addition thereto, the wall thickness of the partitions 110, 111, 112 as well as of the exterior wall 105 may differ in area 132 so the breaking-open of the respective next partition is defined. As a result, damage to the partition or the partitions of the next chamber is avoided.

Figure 7:
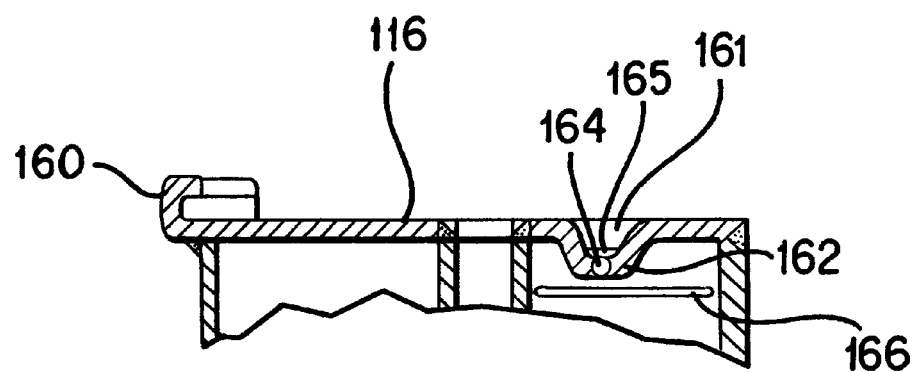
FIG. 7 is a cross-sectional view of the air bag arrangement illustrated in FIG. 6.
Figure 6:
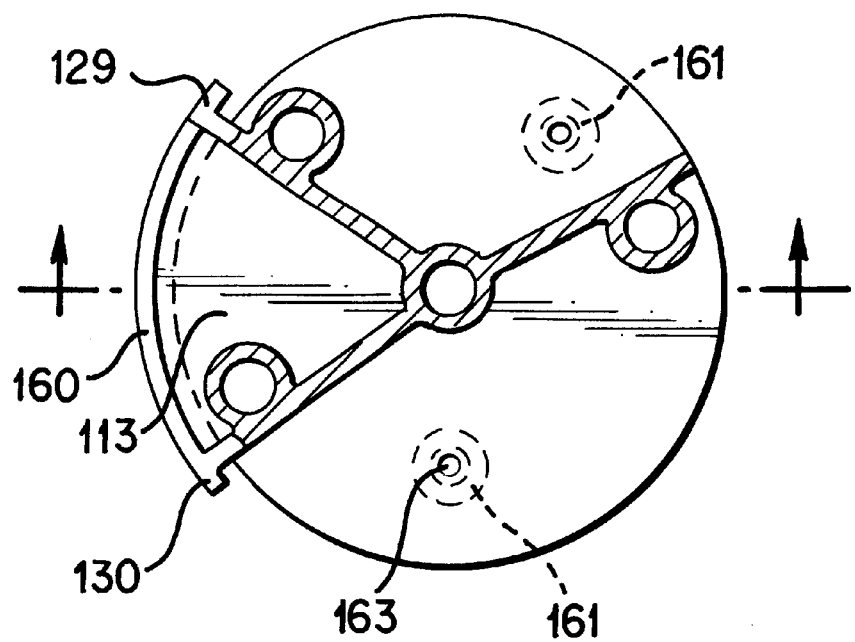
FIG. 6 is a front-side top view of the air bag arrangement illustrated in FIG. 3.

The number of chambers filled with propellant can be varied so that also generators with two or with more than three stages can be implemented. Likewise, the size of the individual chambers and/or the propellant filling quantity can be varied corresponding to the demands on the triggering action in order to provide a corresponding inflating action of the gas bags. The described air bag arrangement can, for example, be situated on the front passenger side in the dashboard in front of the front passenger seat of the motor vehicle. FIGS. 6 and 7 illustrate an axial front side of a segment or gas generator 102, at which a bent fastening rim 160 is provided in the area of the first chamber 113 which is used for fastening the bag rim of the gas bag 103 (not shown) on the front side. Furthermore, the weld seams are schematically illustrated by means of which the cover 116 is welded to the front-side end of the housing 104 of the gas generator 102. An indentation or trough 161 is impressed into the cover 116, the bottom 162 of the trough 161 containing an opening 163 for filling gas into the pertaining chamber. After the filling with gas, the opening 163 is pressed together with a ball 164 which forms gas-tight closure. Subsequently, a sealing lacquer 165 can be applied as an additional sealing device to the bottom of the trough 161 with the pressed-in ball 164. Such a trough 11 may be provided in the cover 116 for each chamber.

FIG. 7 illustrates a weakening 166 of the partition 112 which extends transversely to the longitudinal axis and, as a tear seam, has the purpose of facilitating the defined breaking-open of the partition 112. It can be produced in a cutting manner.

Figure 8:
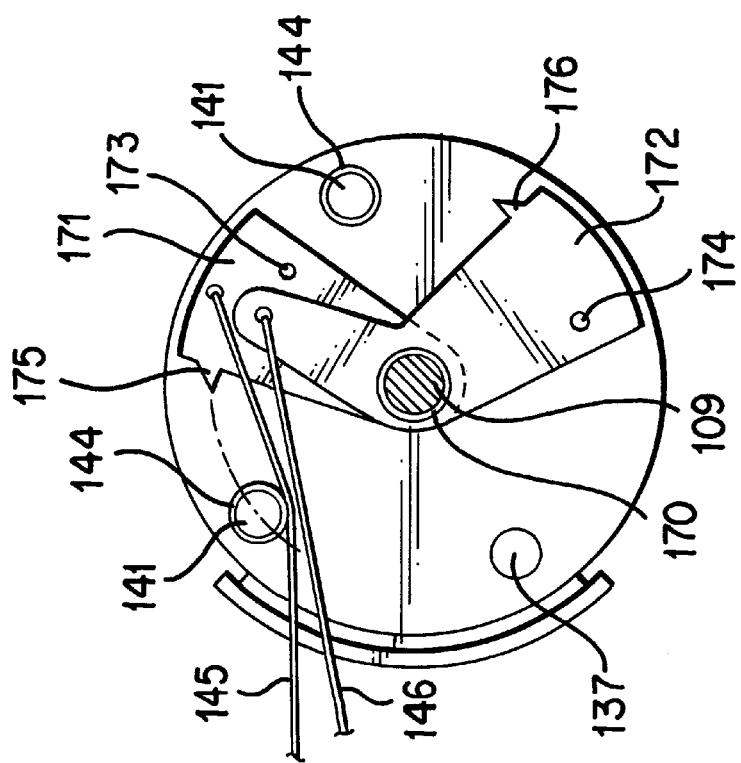
FIG. 8 is a front-side top view of an embodiment of a mechanical ignition device.

FIG. 8 illustrates an embodiment of the mechanical ignition of the second and third stage of the gas generator 102. On a central spacer sleeve 170 surrounding the straining screw 109, two ignition plates 171 and 172 are rotatable disposed axially side-by-side. The ignition plates 171, 172 contain pins or tear pins 173, 174 which, in the inoperative or operative position of the ignition plates 171, 172, extend into the pertaining troughs 161 and therefore hold the ignition plates 171, 172 positioned in the rotating direction, as well as ignition points 175, 176 for striking on the percussion igniters 144 of the ignition cartridges 141. The two ignition plates 171, 172 are connected by way of the respective tension elements (triggering threads, ropes or strings) with the gas bag 103.

Figure 9:
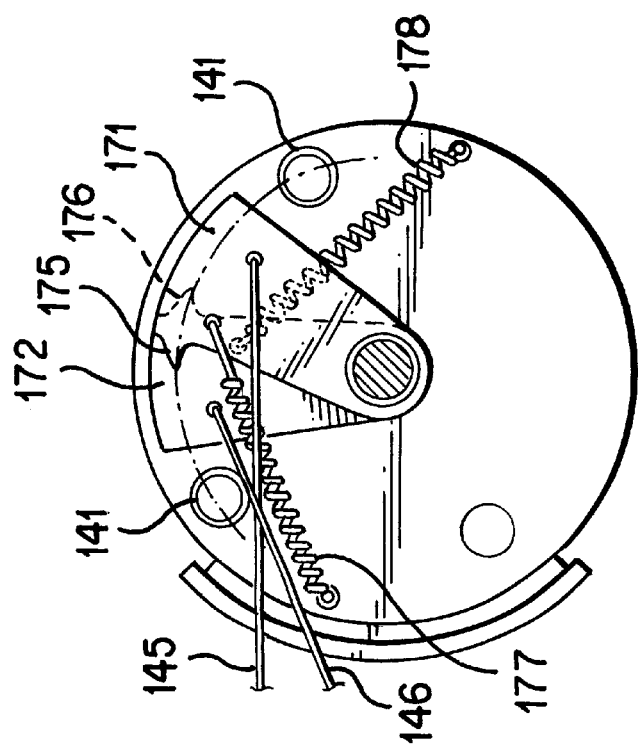
FIG. 9 is a front-side top view of another embodiment of a mechanical ignition device.

FIG. 9 shows an embodiment of the mechanical ignition of the embodiment of FIG. 8. Each ignition plate 171, 172 is prestressed by a tension spring 177, 178 in the inoperative or operative position. By means of the respective triggering ropes 145, 146, the ignition plates 171, 172 are unlocked, as required; for example, the tear pins are sheared off or unlocking mechanisms of a different type are activated. The ignition plates 171, 172 are then provided with their rotating movement for striking upon the percussion igniters 144 by the spring force of the tension springs 177, 178. The triggering force will then be independent of the movement energy of the gas bag 103.

Figure 10:
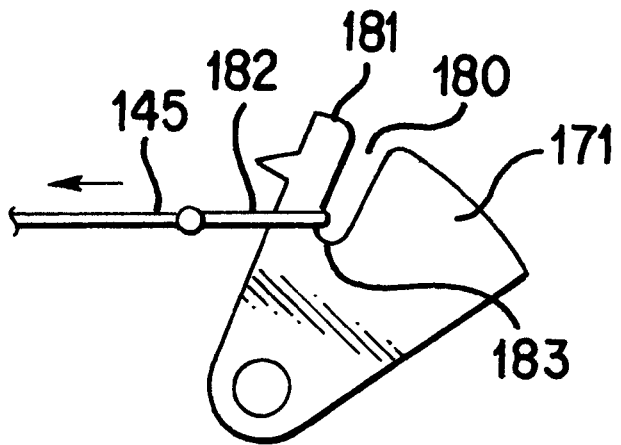
FIG. 10 is a view of an ignition plate of the mechanical ignition device.
Figure 11:
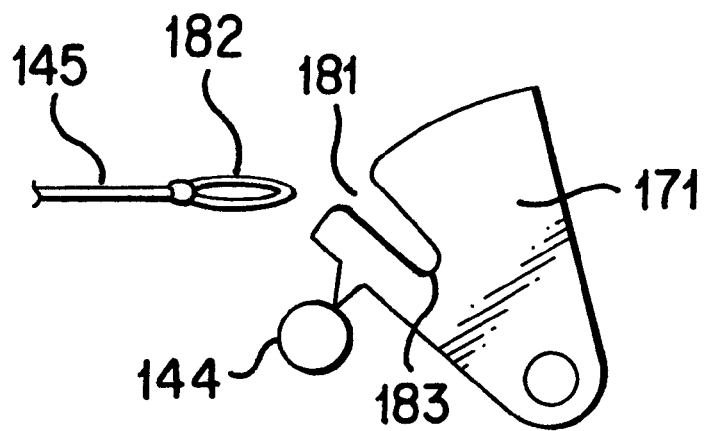
FIG. 11 is a view of the ignition plate of FIG. 10 after its actuating.

The tension elements 145, 146 may be connected with the ignition plates 171 and 172 in the manner illustrated in FIGS. 10 and 11. The ignition plate 171 has an oblong recess 180 which opens toward the edge 181 and extends in the ignition plate 171 in such a manner that, in the inoperative position of the ignition plate 171 (FIG. 10), the tension element 145 rests by means of a ring or a loop 182 on the base 183 of the recess 180. When the tension element 145 is moved by the gas bag 103 (in the direction of the arrow toward the left in FIG. 10), it first remains at the base 183 because of the oblique alignment of the recess 180 while it rotates the ignition plate 171 in the direction of the percussion igniter 144 (FIG. 11). In this position of the ignition plate 171, the loop of the tension element 145 can slide out of the recess 180 so that the connection between the tension element 145 and the ignition plate 171 is disconnected. This design may be provided for supplementing the desired breaking point in the tension element or it may replace the desired breaking point. The tension element 172 has a comparable design.

FIGS. 12 and 13 illustrate an embodiment of the gas generator as a hybrid generator. The housing 104 is constructed similar to the gas generator 102 illustrated in FIG. 3 and has three chambers 113, 114 and 115 for three gas driving stages. However, it differs in that, adjacent to the combustion chambers 118, 119, 120 with the ignition charges or ignition cartridges to be triggered electrically or mechanically, one additional ignition chamber 190, 191, 192 respectively with a solid explosive is provided. An explosion of the ignition charge or the ignition cartridge bursts the wall of the additional ignition chamber and ignites the explosive contained in it which, in turn, bursts open its chamber wall 193, 195 and ignites the gas contained in the chamber. This pyrotechnic mixture or solid and gas of the first stage burst the exterior wall 196 toward the gas bag (not shown). Through the resulting opening, the gas is evacuated toward the gas bag. A net 197 mounted outside the exterior wall 196 catches fragments of the broken-open exterior wall 196 and therefore prevents damage to the gas bag. The units consisting of the ignition chamber and the additional ignition chamber for the second and for the third stage or chamber 114 and 115 are mounted such on the partitions 110, 111 which can be removed by being exploded that, during the explosion of the blasting charge and of the gas in the first chamber 113, they support and stabilize the partitions 110, 111. The partition between the second and the third chamber 114, 115 is constructed as a stable, supporting hollow body structure 198.

FIG. 13 illustrates a connection between two hybrid generators or segments according to the intersection line and direction of the arrow in FIG. 12. The duct, which forms the additional ignition chamber 192 and contains the blasting charge, is closed off and sealed off between the segments by a stopper 199. At the free exterior frontal sides of the segments, these are sealed off, for example, by screwing, in a pressure-tight manner.

Figure 14:
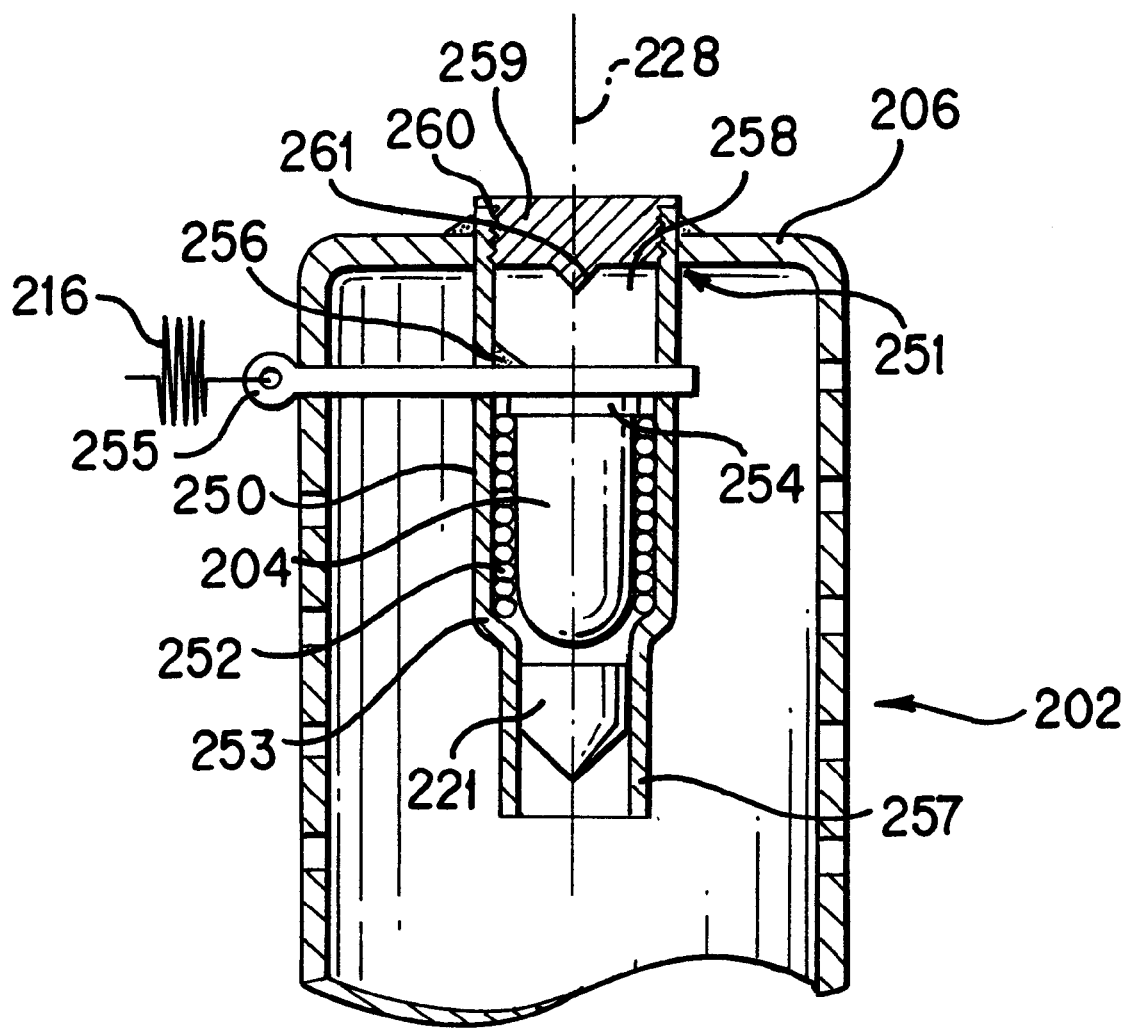
FIG. 14 is a view of an embodiment of an ignition device for an air bag arrangement.

An embodiment of an ignition device for an air bag arrangement is illustrated in FIG. 14. In a gas distributor head 202, a guiding tube 250 is fitted through a bore 251 in an end plate 206 coaxially with respect to the center axis 228 and is welded to the end plate 206. The guiding tube 250 contains an ignition cartridge 204, a coil spring 252 being contained on the circumference of the ignition cartridge 204 between the ignition cartridge 204 and the interior side of the guiding tube 250, which coil spring 252 is supported on one side on a tube constriction 253 in the direction (downward in FIG. 14) to the gas generator (not shown) and, on the other side, on a radially expanded percussion igniter 254 of the ignition cartridge 204 or an intermediate ring. A blocking element in the form of a pin 255 is fitted radially through bores in the gas distributor head 202 and in the guiding tube 250 and keeps the ignition cartridge 204 blocked which rests against the pin 255 while the coil spring 252 is prestressed. The pin 255 is secured against an unintentional sliding-out by means of a sealing 256, for example, by means of a sealing lacquer or adhesive. A tension element 216, which is connected with a gas bag (not visible), is fastened to the pin 255.

The section 257 of the guiding tube 250 pointing to the gas generator (not shown) and adjoining the tube constriction 253 contains a movable projectile 221 which is secured against falling out, for example, by way of a slight press fit. The open tube end 258 of the guiding tube 250 in the area of the end plate 206 is closed off by means of an end screw 259 which is screwed into an internal thread 260 in the guiding tube 250. The end screw 259 has a point 261 or the like which projects in the direction of the ignition cartridge 261.

The triggering of the actuating or ignition device takes place such that, after the pin 255 is pulled out, the ignition cartridge 204 is accelerated by the spring force and impacts by means of its percussion igniter 254 on the point 261, whereby the ignition cartridge 204 is ignited by means of the percussion igniter 254. The exploding ignition charge of the ignition cartridge 204 drives the projectile 221 out of the guiding tube 250 for releasing the propellant in the gas generator (not shown).

Figure 15:
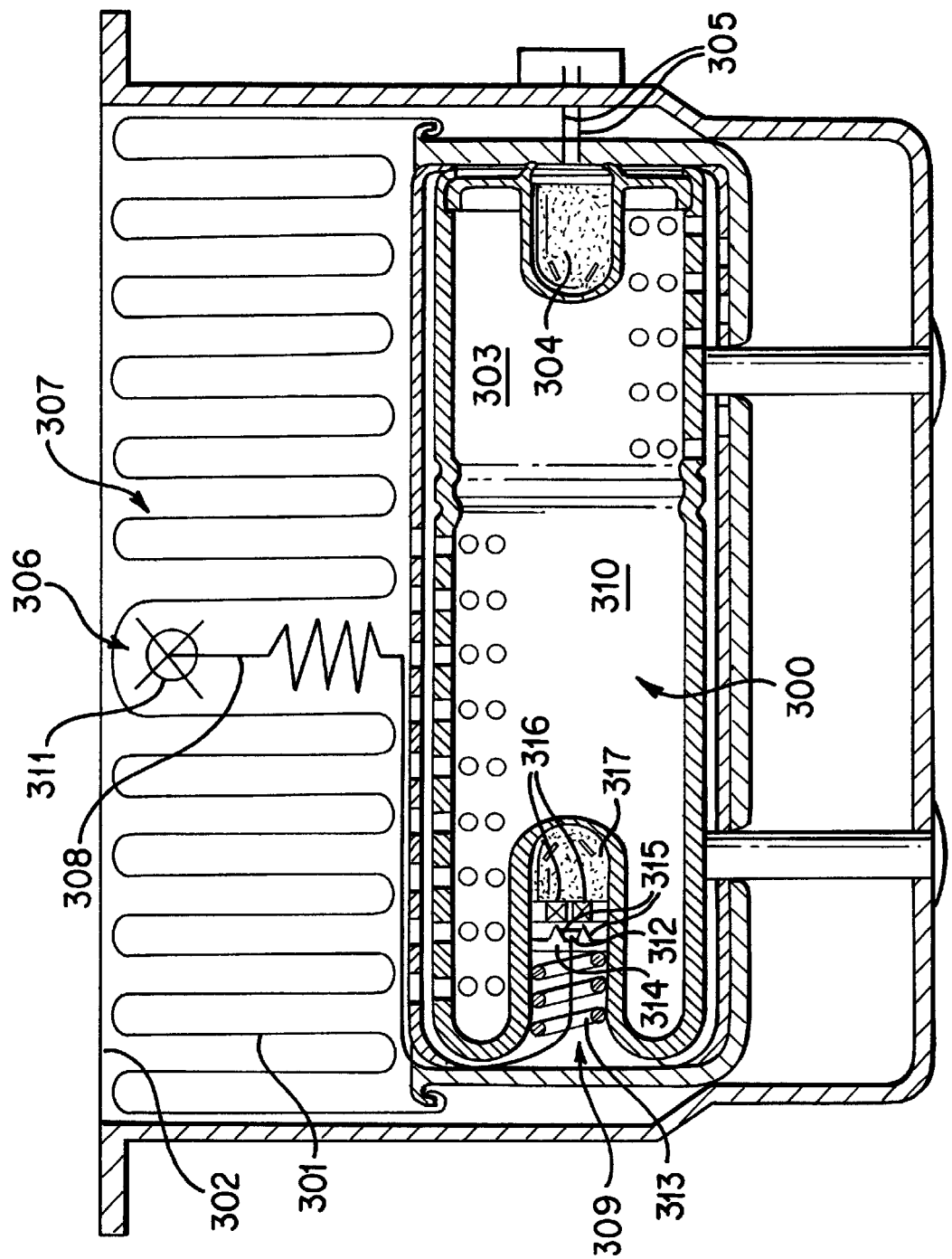
FIG. 15 is a longitudinal sectional view of another embodiment of an air bag arrangement.

FIG. 15 is a longitudinal sectional view of another embodiment of an air bag arrangement which may be housed, for example, in a dashboard in front of a front passenger seat or in a steering wheel in a motor vehicle. When the previous explanations are incorporated, the representation of FIG. 15 is largely self-explanatory so that only significant components and characteristics which have not yet occurred will be described in the following and provided with reference numbers in the illustration.

The air bag arrangement according to FIG. 15 contains a two-stage gas generator 300 and a gas bag 301 which can be inflated by the latter and which is housed in a folded condition behind a covering 302 as long as the gas generator 300 has not been triggered.

If a suitable control (not shown) in a vehicle equipped with this air bag arrangement determines a need for inflating the gas bag 301, the first stage 303 of the gas generator 300 is activated in that an electrically triggerable ignition device 304, such as an ignition cartridge, is ignited by way of electric feed lines 305.

The gas bag 301 is inflated by propellant generated by means of the first stage 304 of the gas generator 300 and expands, in which case it may press away or open the covering 302 if the latter has not yet been opened by other mechanisms. In the center 306 of the forward front 307 of the expanding gas bag 301, a tension element 308, such as a string, is fastened to the interior side of the gas bag 301 which can be acted upon by propellant, the other end of the string being coupled to an actuating device 309 of the second stage 310 of the gas generator 300. On the one hand, the tension element 308 has an overall length which is larger than the length of the connection path from the fastening point 311 of the tension element 308 in the center 306 of the gas bag 301 to the connection point 312 of the tension element 308 on the actuating device 309 of the second stage 310 of the gas generator 300. On the other hand, the length of the tension element 308 is so large that the gas bag 301 can expand into a position in which a meeting with a body part of an occupant presents no danger to the latter, without the exercising of a further tension force onto the no more than maximally tensioned tension element 308.

If the gas bag 301 can expand unhindered beyond the abovedefined position, the tension element 308 is acted upon by a tension force which acts by way of the tension element 308 on the connection point 312 of the tension element 308 on the actuating device 309 of the second stage 310 of the gas generator 300. This additional pulling on the tension element 308 causes a contraction of a pressure spring 313 which is therefore tensioned. No later than when the compression spring 313 is maximally compressed and therefore tensioned, a continued tension force in the tension element 308 has the result that the latter detaches from its connection point 312 on the actuating device 309 of the second stage 310 of the gas generator 300 which can take place in a defined manner by means of a desired breaking or tearing point of the tension element 308 at the connection point 312.

Since the force by means of which the compression spring 313 is tensioned and was kept tensioned is therefore abruptly eliminated, the compression spring 313 will then relax again. In this manner, it accelerates an ignition pin plate 314, which is connected with its pulled-back ends and has two ignition pins 315, in the direction of a pair of percussion igniters 316 of an ignition cartridge 317. If at least one of the ignition pins 315 strikes its assigned percussion igniter 316, the ignition cartridge 317 is ignited and the second stage 310 of the gas generator 300 is therefore triggered. Since in this case, the tension element 308 is no longer coupled to the actuating device 309 of the second stage 310 of the gas generator 300, the gas bag 301 can be further inflated and expanded unhindered by means of the propellant of the second stage 310 of the gas generator 300.

As the result of the fact that the movement of the tension element 308 itself does not directly cause the ignition of the ignition cartridge 317, but that this ignition is caused by the spring force of the compression spring 313, the ignition can take place with a precisely defined force which ensures a reliable ignition when the gas bag 301 has expanded so far that the tension element 308 is, for example, torn off at the connection point 312 on the actuating device 309 of the second stage 310 of the gas generator 300. The ignition operation therefore does not depend on the acceleration of the tension element 308 itself. In addition, such a construction also permits the use of percussion igniters instead of tear or rim igniters which are used in other constructions.

The above-described embodiment provides a possibility for improving all constructions with mechanical igniters which consists of the fact that the cartridge of the gas generator or of the gas generator stage has two mechanically triggerable igniters which are acted upon jointly but preferably independently of one another. In the case of rim ignition cartridges, this can, for example, take place in that two or more ignition strips are provided which each have an ignition nose at a corresponding point. By means of the relative movement between the ignition strips with their ignition noses, on the one hand, and the cartridge with its ignition device, on the other hand, the ignition is triggered, specifically by means of at least one ignition nose and, in general, by one igniter. Analogously, the improvement also functions in the case of tear igniters. In addition, the improvement can also be implemented in the case of cartridges with mechanically triggerable ignition inserts, such as percussion caps, which are ignited by striking or impacting on an ignition pin, as in the embodiment of FIG. 15. Also in the case of this type of igniter construction, a redundancy can be achieved by means of two ignition inserts per cartridge, one ignition pin being provided for each ignition insert, which ignition pin, when triggered, causes the ignition so that at least one combination of the ignition pin and the ignition insert causes the ignition of the cartridge. Under certain circumstances, two different types of ignition can also be combined.

The significant advantage of the above-mentioned improvement consists of the fact that it is increasingly ensured that the ignition of the gas generator or of one of its stages is triggered mechanically. In the case of electrically triggered, that is, ignited energy accumulators, there is a probability of 99,999999 that the ignition is successful. In contrast, in the case of energy accumulators with a mechanically triggered ignition, this probability is only 99,9999. However, if according to the above-described improvement, two mechanical ignition possibilities are used which are triggered jointly but preferably independently from one another, the probability with which an energy accumulator equipped in this manner is mechanically triggered is even above the probability with which an electrical ignition functions.

The above-described double-ignition can be used in any safety device which is actuated by way of energy accumulators and is not limited to the air bag arrangements indicated in these documents. The mechanical double ignition, which advantageously can be used in the case of the air bag arrangements mainly discussed in the present documents, in addition, also has its own inventive significance.

In connection with the above-mentioned topic, it should, however, be taken into account that also second and additional stages or gas generators can be electrically ignited in combination with the expansion control of the air bag arrangement according to the invention. For this purpose, it is only required to couple, for example, the tension element to a switch so that a force exercised on the tensioned tension element triggers the switch. By way of the switch, an electric ignition of a corresponding ignition cartridge can then be triggered. If it is desired or seems required, the electric switch can also be provided twice for an ignition cartridge. This redundancy leads to a further increase of the safety of the triggering of the corresponding gas generator stage or of the respective gas generator.

Figure 16B:
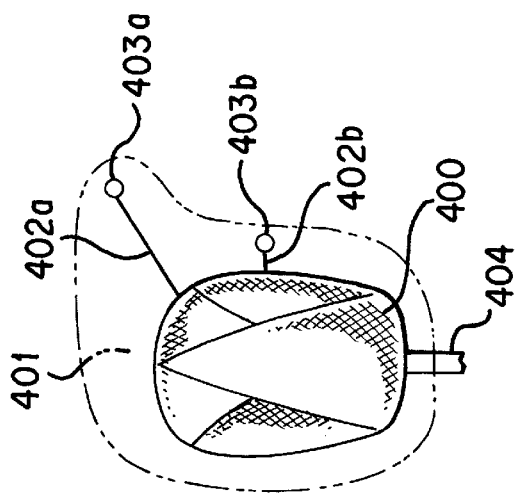
FIG. 16 is a frontal view (FIG. 16A), a lateral view (FIG. 16B) and a top view (FIG. 16C) of an embodiment of a headrest air bag arrangement with mechanical occupant-position-dependent controls.
Figure 16C:
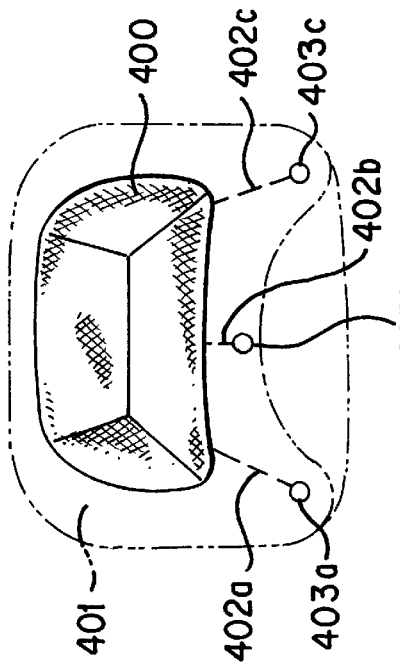
Figure 16A:
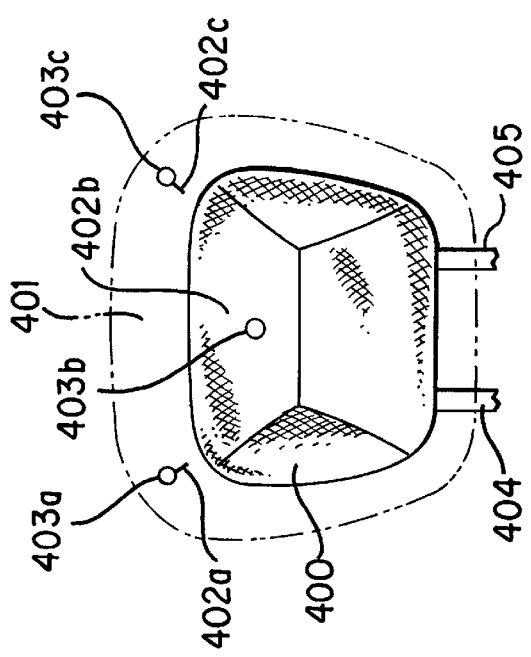

FIGS. 16 to 17 show an embodiment of a headrest air bag arrangement with mechanical occupant-position-dependent controls in a frontal view (Illustration 16A), a lateral view (Illustration 16B) and a top view (Illustration 16C) as well as in Illustration 17A, a part of an air bag arrangement housed inside the headrest cushion and, in Illustration 17B of this air bag arrangement, a detail of the actuating device which is housed in the corresponding seat backrest.

The individual representations of FIG. 16 each show a headrest 400 with respect to which the contour of a completely inflated gas bag 401 of an air bag arrangement is illustrated in broken lines. The expansion of the gas bag 401 is controlled by way of tension elements 402a, 402b and 402c which at fastening points 403a, 403b, and 403c are connected with the interior side of the gas bag 401. In the present embodiment, the headrest 400 also contains mounting rods 404, 405 by means of which the headrest 400 car be mounted on the top side of a backrest part of a vehicle seat (not shown) in that the mounting rods 404, 405 can be fitted into fitting guides in the backrest part.

Figure 17A:
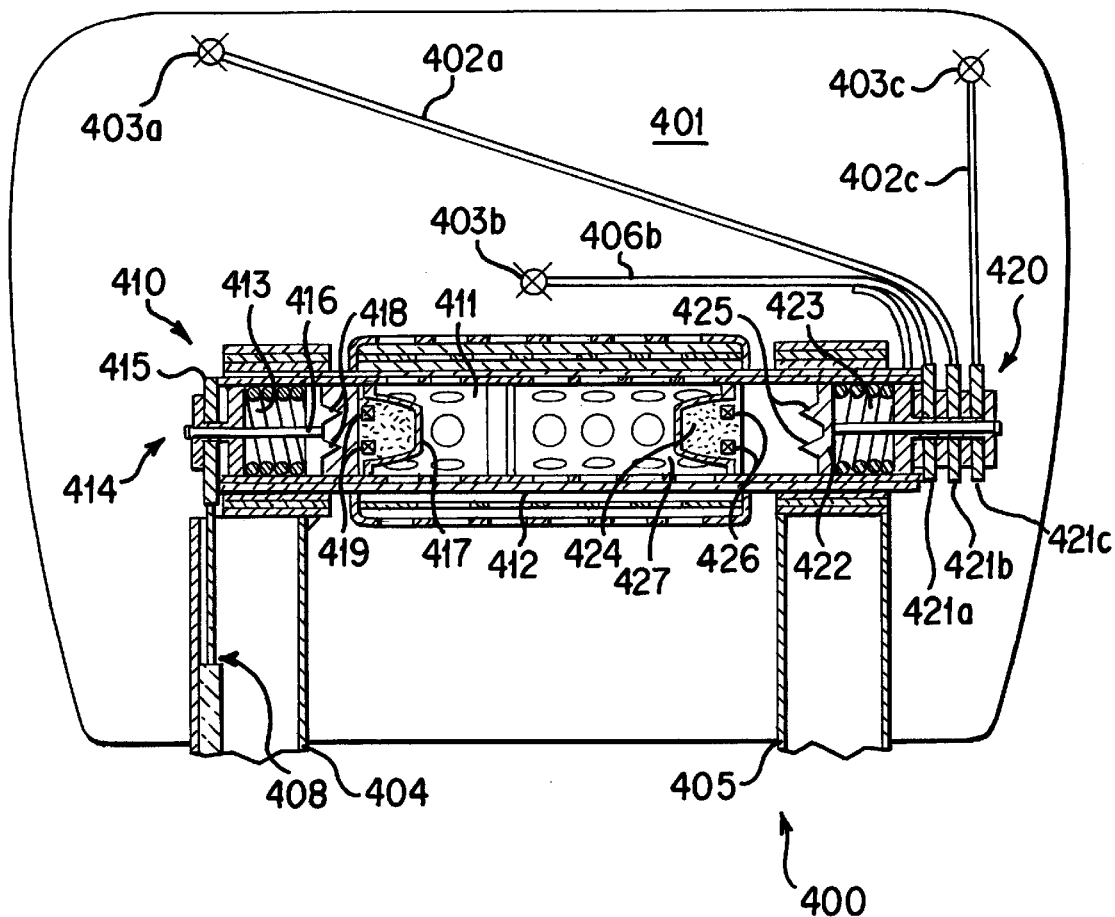
FIG. 17 is a sectional view of a headrest of a vehicle seat on the basis of FIG. 16A, FIG. 17A showing a part of an air bag arrangement housed inside the headrest cushion, and FIG. 17B showing a detail of the actuating device of this air bag arrangement which is housed in the corresponding seat backrest.
Figure 17B:
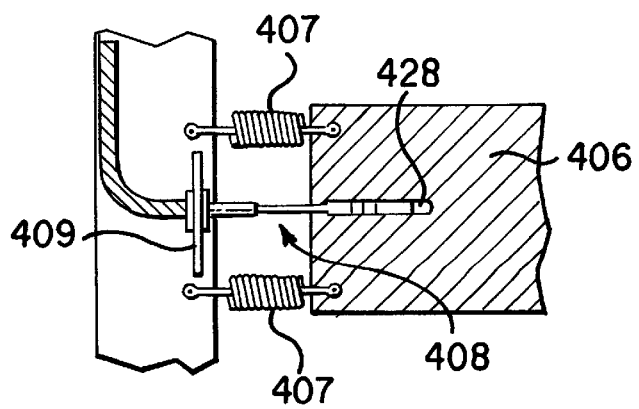

The function of this air bag arrangement will now be explained by means of the sectional and detail views of FIGS. 17A and 17B. Inside the backrest part of a vehicle seat (not shown), at least one pressure absorption arrangement 406 is arranged which contains, for example, at least one strap, preferably two straps. The pressure absorption arrangement 406 is elastically mounted by way of springs 407 within the backrest part of a vehicle seat so that, provided the seat is installed in a vehicle in the driving direction, in the case of a rear impact, as the result of the mass of an occupant sitting in the rear, an acceleration force is exercised on the pressure absorption arrangement 406. As a result, the pressure absorption arrangement 406 is acted upon and deflected against the force of the springs 407. This deflection, in turn, is transmitted by means of a Bowden cable 408, which is connected with the pressure absorption arrangement 406 and has adjusting devices 409, to actuating devices 410 and a first stage 411 of a gas generator 412 of the air bag arrangement. The Bowden cable 408 extends out of the seat backrest (not shown) through one of the mounting rods 404, 405 (in FIG. 17A through the mounting rod 404) into the headrest 400.

The actuating devices 410 of the air bag arrangement contain a compression spring 413 which, by means of safety devices 414, such as a U-formed securing plate 415 (or a clasp), which engages with a stamp 416 which compresses the compression spring, and thereby holds the latter (something missing in the German—Translator). The above-described action upon the pressure absorption arrangement 406 leads to a pulling on the wire of the Bowden cable 408 which is coupled to the U-shaped securing plate 415 and pulls the latter away from the stamp 416. Since the stamp 416 is no longer fixed because of the elimination of the engagement with the U-shaped securing plate 415, the originally tensioned, that is, compressed compression spring 413 relaxes and in this case accelerates also the stamp 416 in the direction of an ignition cartridge 417. On its surface facing the ignition cartridge 417, the stamp 416 has two ignition pins 418 which are situated opposite two igniters 419 on the ignition cartridge 417. By releasing the compression spring 413, by means of the latter, the ignition pins 418 are impacted onto the igniters 419 and, as a result, the ignition cartridge 417 is ignited which, in turn, triggers the first stage 411 of the gas generator 412.

The triggered first stage 411 of the gas generator 412 inflates the gas bag 401 of the air bag arrangement, in which case the tension elements 402a to 402c are tensioned when their fastening points 403a to 403c do not strike obstacles or, more generally, the gas bag 401 strikes no obstacles in the environment of the fastening points 403a to 403c. The further expansion of the gas bag 401 in the case of tensioned tension elements 402a to 402c has the result that the pulling is continued on the latter.

Similarly to the wire of the Bowden cable 408, the tension elements 402a, 402b, 402c are connected with safety devices 420 which each contain a U-shaped securing plate 421a, 421b and 421c and a stamp 422 which is contained in the latter and which holds a compression spring 423 under prestress. By a pulling on each of the U-shaped securing plates 421a, 421b, 421c, these disengage from the stamp 422. As a result, the compression spring 423 is released which, when it is relaxed abruptly, that is, expanded, strikes the stamp 422 onto an ignition cartridge 424. Since the stamp 422 is provided with two ignition pins 425 on its side facing the ignition cartridge 424 and the ignition cartridge 424 has to igniters 426 pointing to the stamp, this results in the ignition of the ignition cartridge 424 and thus in the triggering of a second stage 427 of the gas generator 412.

It should be taken into account that, in the case of the above-described embodiment, the second stage 427 of the gas generator 412 will be triggered only, that is, the compression spring 423 will be released only when all U-shaped securing plates 421a, 421b, 421c, are disengaged from the stamp 422, thus analogously to an AND-circuit or combination of the three U-shaped securing plates 421a, 421b, 421c. As an alternative, it may also be provided in the case of other applications and/or arrangements of the air bag arrangement that it is sufficient for a triggering of the second stage 427 of the gas generator 412 for a securing plate or two securing plates to be possibly removed in a certain combination which would correspond to various forms of OR-combinations of the securing plates. Such a method of operation may be desirable for catching a body or a body member by means of the expanding air bag.

It should also be mentioned that, in the case of a headrest air bag arrangement, suitable measures should be taken for the protection against noise and for the protection against particles flying about. As generally known in the art, various sieves and/or perforated plates, as illustrated schematically in FIG. 17A, are suitable for this purpose. The headrest 400 may be an adjustable or an unadjustable headrest which is externally mounted on the seat or integrated in it. FIG. 17B also shows, in the case of the strip of the pressure absorption arrangement 406, that the coupling of the wire of the Bowden cable 408 with the strip takes place by way of a displacement slot 428 so that effects onto the strip to a certain extent remain without consequence with respect to the triggering of the headrest air bag arrangement. Only when the pressure absorption arrangement 406 is acted upon above the extent which is permitted by the displacement slot 428 and is therefore adjusted, is there a transmission of this movement to the wire of the Bowden cable 408. The acceleration acting upon the pressure absorption arrangement 406 and/or the deflection of the latter can be used as the triggering quantity, admissible limit values being used as the basis in each case. In order to permit certain tolerances during the expanding of the gas bag; possibly cause a positioning of the body or body member; and/or indicate a defined force during the unhindered expanding of the gas bag for a triggering of additional stages of the gas generator, damping and/or spring members (not shown) may be integrated in the tension elements. Without limitations, the triggering of the first stage 411 of the gas generators 412, instead of taking place by means of the pressure absorption device 406, may also take place in a different manner, as, for example, by means of a sensor-controlled electric triggering.

Figure 18:
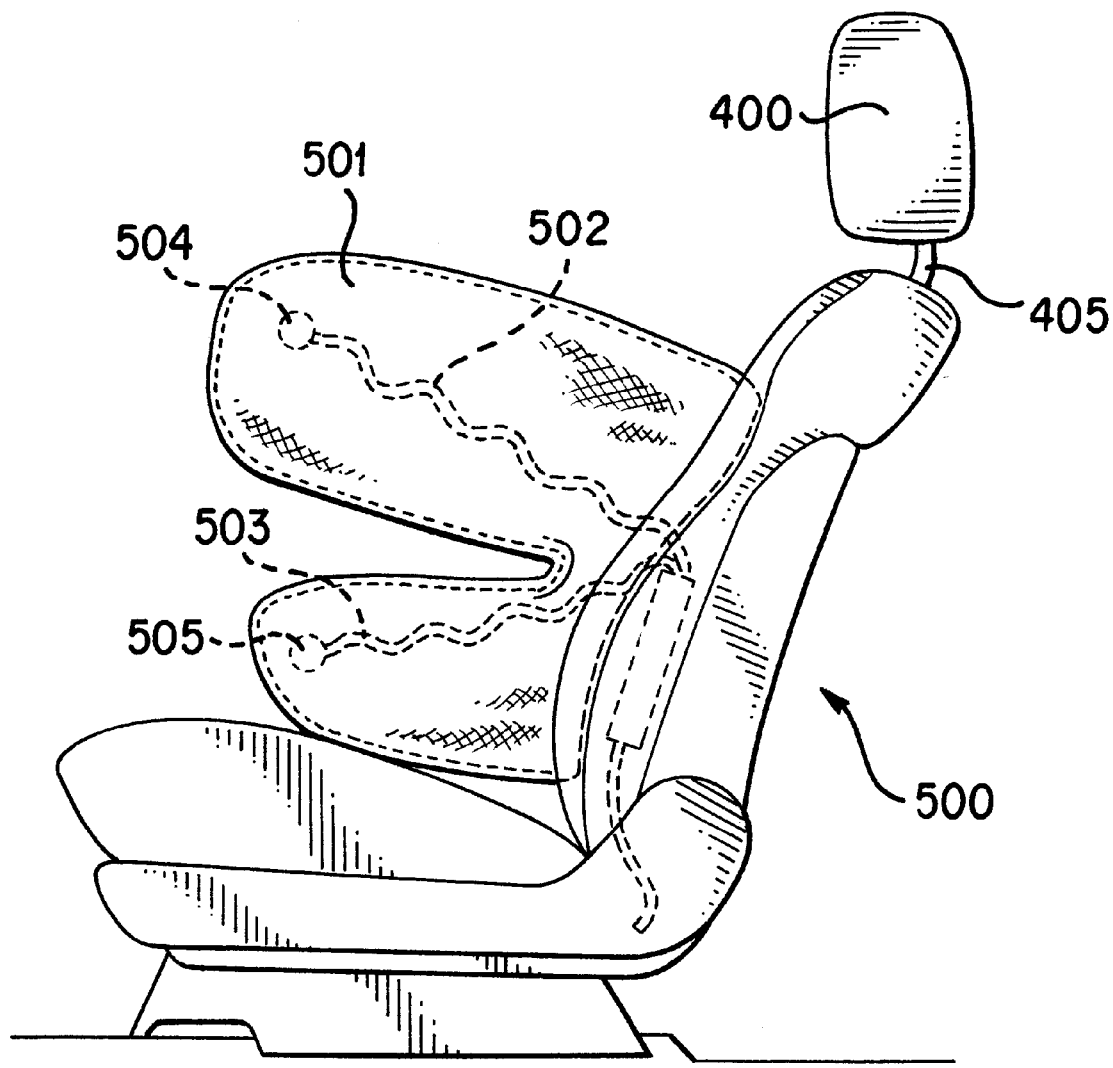
FIG. 18 is a view of an embodiment of a side air bag arrangement on/in a vehicle seat.

The invention is also suitable for side air bag arrangements, as, for example, the side air bag arrangement housed in a vehicle seat 500 which is illustrated in FIG. 18. This side air bag arrangement contains a gas bag 501 which is illustrated in its completely inflated condition. Although, in FIG. 8, a gas bag is illustrated only on one side of the seat 500, such a gas bag may also be provided on the other side of the seat 500. The controlling of the expansion of the gas bag 501 takes place, as in the above-described embodiments, by means of tension elements 502, 503 which are mounted at fastening points 504, 505 on the interior side of the gas bag 501. Therefore, when the tension elements 502, 503 are acted upon by a triggering of a first stage of a gas generator of the air bag arrangement beyond it., completed tensioned condition, at least a second stage of the gas generator of the air bag arrangement is triggered.

Figure 19:
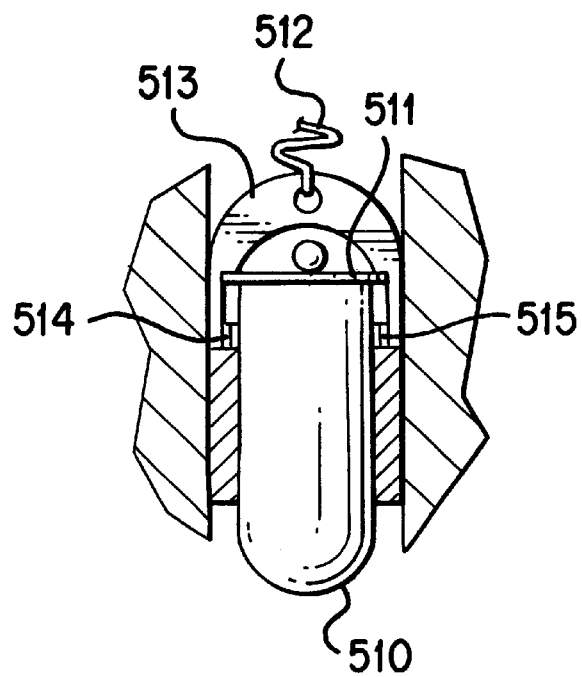
FIG. 19 is a view of details of an embodiment of an actuating device in combination with an ignition device.
Figure 20:
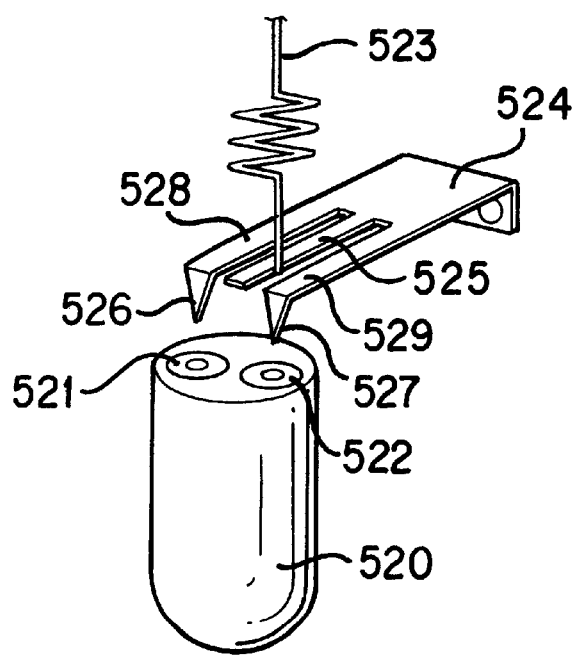
FIG. 20 is a view of details of another embodiment of an actuating device in combination with an ignition device.

FIGS. 19 and 20 illustrate additional embodiments of actuating devices with double mechanical ignition devices. The version according to FIG. 19 relates to a rim igniter cartridge 510 which is ignited by the impact on its ignition rim 511. For this purpose, an ignition bow 513 is connected with a tension element 512, which ignition bow 513 has two ignition noses 514 and 515. When a pulling takes place on the tension element 512 in that the first stage of a gas generator is triggered and the gas bag, which is filling with therefore generated propellant, expands in an unhindered manner, the ignition bow 513 with the two ignition noses 514 and 515 is moved to the ignition rim 511 of the rim igniter cartridge 510 and beyond. When even one of the two ignition noses 514 and 515 impacts on the ignition rim 511, the rim igniter cartridge 510 is ignited, whereby a successive stage of the gas generator or another gas generator is triggered. By means of the double mechanical triggering, the triggering reliability is increased in the above-described manner. Because of the fact that the ignition bow 513 with the two ignition noses 514 and 515 can be pulled on the tension element 512 completely beyond the ignition rim 511 of the ignition igniter cartridge 510, it is ensured that the further inflating of the gas bag will not be hindered by the fact that the tension element 512 is hung up. The ignition rim 511 of the rim igniter cartridge 510 therefore not only represents the actual triggering device for the ignition of the edge igniter cartridge 510 but simultaneously acts as a desired breaking point which releases the tension element 512 after the ignition of the edge igniter cartridge 510.

The same function is achieved by the embodiment illustrated in FIG. 20. This is an igniter cartridge 520 with two percussion igniters 521, 522. The tension element 523 connected with the interior side of a gas bag is hung into a spring plate 524, specifically a holding tongue 525. On both sides next to the holding tongue 525, the spring plate 524 has two more ignition tongues 528, 529 bent to form ignition points 526, 527. If a pulling takes place on the tension element, the spring plate 524 is first deflected in the pulling direction and is therefore prestressed. In the case of a certain deflection position of the spring plate 524, the tension element 523 slides off the holding tongue 525 and the spring plate 524, which otherwise is mounted stationarily with respect to the igniter cartridge 520, strikes back onto the igniter cartridge 520, or more precisely, onto its percussion igniter 521 and 522. As a result, the igniter cartridge 520 is ignited and an assigned gas generator or its corresponding stage is triggered.

List of reference numbers 1 housing of a gas generator
2 cylindrical exterior wall
3 partition
4 first propellant chamber
5 second propellant chamber
6 underside
7 floor
8 top side
9 covering
10,11 inwardly set-back wall sections
12,13 groove-shaped indentations
14 central longitudinal axis of the housing 1
15 cylindrical first ignition chamber
16 cylindrical ignition chamber partition
17 section
18 weakening, indentation or groove
19 electric igniter
20 igniter housing
21 web
22 metallic plate or metallic membrane
23 cylindrically shaped second ignition chamber
24 ignition chamber partition
25 piston
26 cylindrical guide
27 ignition cartridge
28 rim igniter
29 igniter chamber 30 slit-shaped opening
31 lateral nose of piston
32 floor plate
34 screw-type lid
40 gas bag
41 fabric
42 clamping ring
43 central area of gas bag
44 tension element, such as strap or rope
45 opening
46 fastening hole
50, 51 grooves, tear grooves
52 wedge
53 desired breaking points
101 air bag generators
102 gas generator (102a, 102b, 102c)
103 gas bag (103a, 103b, 103c)
104 housing
105 cylindrical exterior wall
106 cylindrical interior wall
107 cylindrical longitudinal axis
108 opening
106 straining screw
110,111,112 partitions
113,114,115 chambers
116,117 lid
118,119,120 ignition chamber
121,122,123 ignition chamber partition
124 gas bag housing
125, 126 lower housing wall
127 upper bag rim
128 lower bag rim
129,130 fastening rails
131 exterior side of housing
132 area of exterior wall of housing
133 desired breaking point
134 sieve
135 holding elements
136 ignition charge
137 igniter
138 feed line
140 spacer sleeves
141 ignition cartridge
142 ring igniter
143 lever
144 percussion igniter
145, 146 tension element, triggering rope
147 desired breaking point
148 center area of gas bag
149 desired breaking points
150 desired breaking point
151,152 connection
153 vehicle occupant
160 fastening wall
161 trough
162 bottom
163 bore, opening
164 ball
165 sealing lacquer
166 weakening
170 spacer sleeve
171,172 ignition plates
173,174 pins, tear pins
175,176 ignition points
177,178 tension spring
180 oblong recess
181 rim
182 loop
183 base of recess
190,191,192 ignition chamber
192,194,195 chamber wall
196 exterior wall
197 net
198 hollow body structure
199 stopper
202 gas distributor head
204 ignition cartridge
206 end plate
216 tension element
221 movable projectile
228 center axis
250 guiding tube
251 bore
252 coil spring
253 tube constriction
254 percussion igniter
255 blocking element, pin
256 sealing
257 section of guiding tube
258 tube end
259 end screw
260 internal thread
261 point
300 two-stage gas generator
301 gas bag
302 covering
303 first stage of gas generator
304 electrically triggerable ignition device 304
305 electric feed lines
306 center
307 forward front
308 tension element
309 actuating device
310 second stage of gas generator
311 fastening point
312 connection point
313 compression spring
314 ignition pin plate
315 ignition pins
316 percussion igniter
317 ignition cartridge
318 headrest
401 gas bag
402a,402b,402c tension elements
403a,403b,403c fastening points
404,405 mounting rods
406 pressure absorption device
407 springs
408 bowden cable
409 adjusting devices
410 actuating devices
411 first stage of gas generator
412 gas generator
413 compression spring
414 securing devices
415 U-shaped securing plate
416 stamp
417 ignition cartridge
418 ignition pins
419 igniter
420 securing devices
421a,421b,421c U-shaped securing plate
422 stamp
423 compression spring 424 ignition cartridge
425 ignition pins
426 igniter
427 second stage of gas generator
428 displacement slot
500 vehicle seat
501 gas bag
502,503 tension elements
504,505 fastening points
510 rim ignition cartridge
511 ignition rim
512 tension element
513 ignition bow
514,515 ignition noses
520 igniter cartridge
521,522 percussion igniter
523 tension element
524 spring plate
525 holding tongue
526,527 ignition points
528,529 ignition tongues

What is claimed is:

1. Air bag arrangement in a vehicle comprising:
gas bag which can be inflated with gas,
a sensor which triggers inflation of the gas bag so that, while inflating, the gas bag can be advanced into a vehicle interior, and
first and further propellant charges providing at least two successively ignitable driving stages, ignition of the first propellant charge being triggered by said sensor and each further propellant charge being ignited when the gas bag moves beyond a respectively defined advancing position,
wherein the gas bag itself, while advancing, controls triggering of an ignition device of a second propellant charge.

2. Air bag arrangement according to claim 1, wherein the at least two driving stages are formed by a corresponding number of separate propellant charges of at least one gas generator within at least one housing with at least one propellant charge, respectively, said at least one housing having at least two propellant chambers filled with a propellant, and with a respective ignition device.

3. Air bag arrangement according to claim 2, wherein the propellant chambers have different volumes and/or different filling quantities of propellant, and/or wherein an ignition chamber with a pyrotechnic igniter is assigned to each propellant chamber.

4. Air bag arrangement according to claim 2, wherein each propellant chamber has an axial boundary which opens up after a respective ignition by the propellant pressure for the outflow of the propellant into the gas bag, the boundary for the defined opening having at least one desired breaking point and/or different wall thicknesses, and further comprising a sieve arranged between the boundary and the gas bag.

5. Air bag arrangement according to claim 2, wherein the housing is produced from a light-metal extruded profile, and/or wherein the housing has an essentially cylindrical shape for a steering wheel of a motor vehicle.

6. Air bag arrangement according to claim 2, wherein the gas generator is constructed as a hybrid generator with an additional explosive agent in the ignition chambers.

7. Air bag arrangement according to claim 2, wherein, on its top side, the housing has a metallic membrane which is welded to the housing as the boundary of propellant chambers and/or wherein a floor plate of the housing has screw-type lids for closing the ignition chambers.

8. Air bag arrangement according to claim 2, wherein the gas bag is arrange d in a folded condition on the top side of the housing, reaches around the housing on its circumference and is fastened on the underside of the housing by a clamping ring.

9. Air bag arrangement according to claim 1, wherein an electrical igniter is provided for electrically igniting the first propellant charge or stage, and/or wherein, for igniting each additional propellant charge, one mechanical actuating device is respectively provided for triggering a mechanical ignition device or an electric ignition device.

10. Air bag arrangement according to claim 9, wherein at least one tension element is coupled with the gas bag and the actuating device so that, in a defined advancing position of the gas bag, ignition of a following propellant charge is caused.

11. Air bag arrangement according to claim 10, wherein the mechanical ignition device of at least one additional propellant charge or stage has a movable piston as a percussion igniter for the ignition device.

12. Air bag arrangement according to claim 11, wherein the piston is connected with the tension element and can be moved by it, and in that connection of the piston with the gas bag can be released by the tension element, particularly after the piston has moved for triggering the ignition, the piston preferably being prestressed by a spring, and/or wherein the piston has a nose for impacting on a ring igniter of an ignition charge.

13. Air bag arrangement according to claim 1, wherein, in its inoperative position, the gas bag is folded such that, during the filling with propellant, first its central area unfolds and wherein, during the further filling of each further propellant charge, its rim areas are filled.

14. Air bag arrangement according to claim 1, wherein the air bag arrangement has several air bag generators, each containing a gas bag and a gas generator with a multi-stage gas generation and by which the respective gas bag, as a function of its unhindered expansion into the passenger compartment, can be increasingly filled in stages with propellant.

15. Air bag arrangement according to claim 14, wherein the first propellant charges or stages of the gas generators of the air bag generators for initial filling of the gas bags can be ignited simultaneously and electrically, wherein the further stages of the gas generators can be ignited independently of one another and preferably by mechanically actuated ignition devices, the mechanical ignition device having an ignition plate which is prestressed by a spring and which is connected with the tension element and can be moved by it, and wherein the tension element can be detached from the ignition plate after it has moved the latter.

16. Air bag arrangement according to claim 15, wherein devices are provided by which the gas bag of each air bag generator, during its unhindered advance, triggers an ignition device of the next stage of the gas generator and, when its advance is hindered, causes no ignition of another stage, and wherein the gas bag contains at least one triggering tension element which, when the advancing position of the gas bag is defined, mechanically ignites the next stage of the gas generator.

17. Air bag arrangement according to claim 14, wherein a housing of the gas generator has several chambers filled with a propellant and an ignition device is assigned to each chamber, the chambers having different volumes and/or different quantities of propellant.

18. Air bag arrangement according to claim 17, wherein an ignition chamber with a pyrotechnic igniter is assigned to each chamber and/or partitions are provided between the chambers, which partitions, after the respective ignition of the igniter and/or of the propellant, open up for filling the gas bag, preferably those partitions or exterior boundary walls which are to open after the ignition of the propellant having desired breaking points and/or different wall thicknesses.

19. Air bag arrangement according to claim 18, wherein the partition to be broken open for the outlet of the propellant from the respective chamber can be weakened by the ignited pyrotechnic igniter and/or in that the ignition chamber with the pyrotechnic igniter is arranged on the partition to be broken open of the respective chamber.

20. Air bag arrangement according to claim 14, and further comprising a sieve which covers an outlet opening in the housing of the gas generator which opens up for the flowing-out of the propellant during the filling of the gas bag.

21. Air bag arrangement according to claim 14, wherein the air bag generators are produced from a light-metal extruded profile, and/or in that at least two air bag generators are arranged side-by-side.

22. Air bag arrangement according to claim 14, wherein the air bag generators are essentially arranged on a common axis which extends perpendicularly to the main advancing direction of the gas bags and approximately horizontally, and/or wherein the gas bags of two adjacent air bag generators are mutually connected such that, during the unfolding, each gas bag can cover a defined portion of its advancing path independently of the other gas bag.

23. Air bag arrangement according to claim 14, wherein, in its inoperative position, the gas bag is folded such that, during the filling with propellant, first a central area unfolds and, during a further filling with propellant, additional stages of its rim areas are filled.

24. Air bag arrangement according to claim 1, wherein the gas bag is part of a frontal air bag, a side air bag or a headrest air bag housed in a vehicle seat.

25. Triggering process for an air bag arrangement comprising the steps of:

triggering a first stage of at least one gas generator or at least a first gas generator as a function of a driving situation, guiding gas generated in this manner into at least one gas bag for partial filling of the at least one gas bag, controlling, by the gas bag itself while it is advancing during filling, triggering of at least one additional stage of the gas generator or at least one additional gas generator for further or complete filling of the gas bag.

26. Triggering process for an air bag arrangement according to claim 25, and further comprising the step of effecting the control of triggering at least one additional stage of the gas generator or the at least one additional gas generator for further or complete filling of the gas bag mechanically by coupling the gas bag and the additional stage or the additional generator.

* * * * *